(12) United States Patent
Maillard et al.

(10) Patent No.: US 7,239,704 B1
(45) Date of Patent: Jul. 3, 2007

(54) METHOD AND APPARATUS FOR RECORDING OF ENCRYPTED DIGITAL DATA

(75) Inventors: Michel Maillard, Maintenon (FR); Christian Benardeau, Bussy Saint Georges (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/622,137

(22) PCT Filed: Feb. 11, 1999

(86) PCT No.: PCT/IB99/00303

§ 371 (c)(1),
(2), (4) Date: Aug. 11, 2000

(87) PCT Pub. No.: WO99/41907

PCT Pub. Date: Aug. 19, 1999

(30) Foreign Application Priority Data

| Feb. 13, 1998 | (EP) | ................................... 98400344 |
| Jun. 18, 1998 | (EP) | ................................... 98401513 |

(51) Int. Cl.
*H04N 7/167* (2006.01)
(52) U.S. Cl. ................ 380/210; 380/230; 380/239
(58) Field of Classification Search ............ 380/210, 380/216, 217
See application file for complete search history.

(56) References Cited

U.S. PATENT DOCUMENTS

| 5,621,793 | A | * | 4/1997 | Bednarek et al. ............ 380/240 |
| 5,796,828 | A | * | 8/1998 | Tsukamoto et al. ......... 380/203 |
| 5,991,400 | A | * | 11/1999 | Kamperman ................ 380/239 |
| 6,178,242 | B1 | * | 1/2001 | Tsuria ........................ 380/201 |
| 6,266,415 | B1 | * | 7/2001 | Campinos et al. .......... 380/247 |
| 6,714,650 | B1 | * | 3/2004 | Maillard et al. ............ 380/231 |

FOREIGN PATENT DOCUMENTS

| EP | 0 714 204 A2 | 5/1996 |
| EP | 714204 A2 * | 5/1996 |
| EP | 0 769 936 A2 | 3/1997 |
| FR | 2 732 537 | 10/1996 |
| FR | 2732537 A * | 10/1996 |

OTHER PUBLICATIONS

French to English translation of document FR 2,732,537 A, performed by FLS, INC.*

* cited by examiner

*Primary Examiner*—Nasser Moazzami
*Assistant Examiner*—Brandon Hoffman
(74) *Attorney, Agent, or Firm*—Osha Liang LLP

(57) ABSTRACT

A method relating to recording transmitted digital data in which transmitted digital information is encrypted by a recording encryption key. The recording encryption key is stored by a recording means on a recording support medium. Further, the recording encryption key is characterized in that an equivalent of the recording encryption key is encrypted by a recording transport key, which is also stored on the support medium with the encrypted information.

24 Claims, 15 Drawing Sheets

Fig.3.
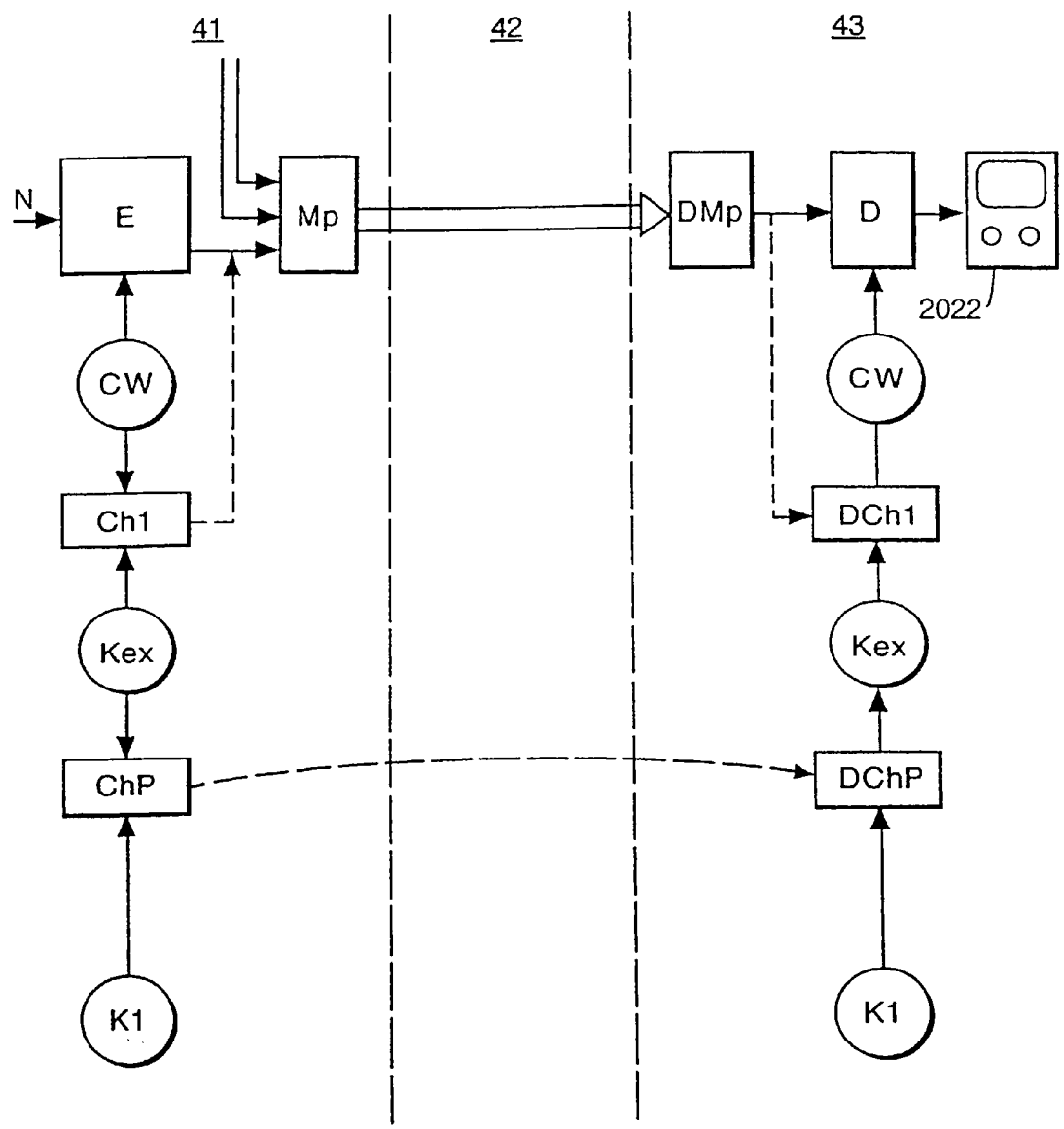
PRIOR ART
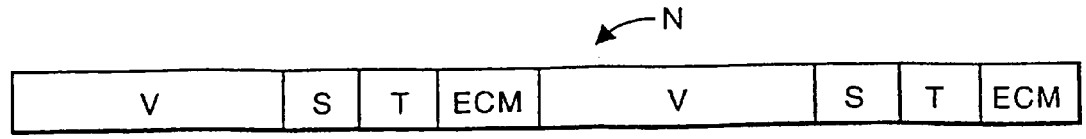

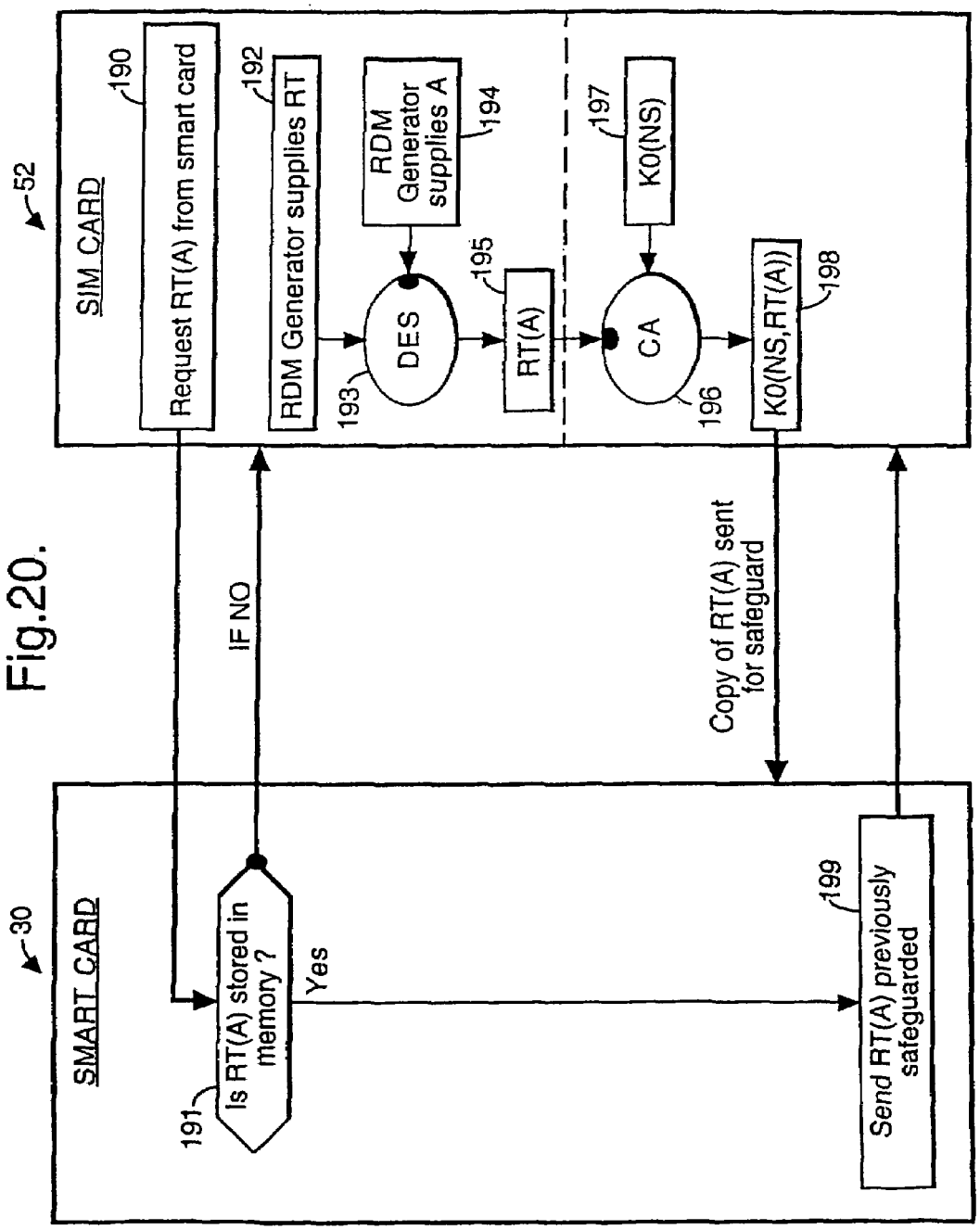

METHOD AND APPARATUS FOR RECORDING OF ENCRYPTED DIGITAL DATA

BACKGROUND OF INVENTION

1. Field of the Invention

The present invention relates to a method and apparatus for recording scrambled digital data, for example television broadcasts.

2. Background Art

Transmission of encrypted data is well-known in the field of pay TV systems, where scrambled audiovisual information is broadcast typically by satellite to a number of subscribers, each subscriber possessing a decoder or integrated receiver/decoder (IRD) capable of descrambling the transmitted program for subsequent viewing.

In a typical system, scrambled digital data is transmitted together with a control word for descrambling of the digital data, the control word itself being encrypted by an exploitation key and transmitted in encrypted form. A decoder receives the scrambled digital data and encrypted control word which uses an equivalent of the exploitation key to decrypt the encrypted control word and thereafter descramble the transmitted data. A paid-up subscriber will receive periodically the exploitation key necessary to decrypt the encrypted control word so as to permit viewing of a particular program.

With the advent of digital technology, the quality of the transmitted data has increased many times over. A particular problem associated with digital quality data lies in its ease of reproduction. Where a descrambled program is passed via an analogue link (e.g. the "Peritel" link) for viewing and recording by a standard VCR the quality remains no greater than that associated with a standard analogue cassette recording. The risk that such a recording may be used as a master tape to make pirate copies is thus no greater than with a standard shop bought analogue cassette.

By way of contrast, any descrambled digital data passed by a direct digital link to one of the new generation of digital recording devices (for example, a DVHS recorder) will be of the same quality as the originally transmitted program and may thus be reproduced any number of times without any degradation of image or sound quality. There is therefore a considerable risk that the descrambled data will be used as a master recording to make pirate copies.

French Patent Application 95 03859 shows one way of overcoming this problem, by means of a system in which descrambled digital data is never allowed to be recorded on the digital recording medium. Instead, the decoder described in this application forwards the data for recording on the support medium in its scrambled form. The control word necessary to descramble the data is re-encrypted by means of another key and stored on the recording support with the scrambled data. This new key is known only to the receiver/decoder and replaces the exploitation key needed to obtain the control word for viewing of the program.

The advantage of such a system is that the data is never stored in a "clear" form and cannot be viewed without possession of the new key, stored in the decoder. The system also possesses the advantage that, since the exploitation key changes on a monthly basis, the use of a key chosen by the decoder to re-encrypt the control word registered on the digital tape means that the decoder will still be able to decrypt the control word recorded on the tape even after the end of a subscription month.

The disadvantage of the system propose in this previous patent application is that the recording can only be viewed in conjunction with that particular decoder. If that decoder breaks down, or is replace, the recording can no longer be replayed. Equally, it is not possible to play the recording directly in a digital recorder without connecting the decoder in the system.

SUMMARY OF INVENTION

It is an object of the present invention in its broadest and specific aspects to overcome some or all of the problems associated with this known solution.

According to the present invention, there is provided a method of recording transmitted digital data in which transmitted digital information is encrypted by a recording encryption key and stored by a recording means on a recording support medium and characterized in that an equivalent of the recording encryption key is encrypted by a recording transport key and stored on the support medium together with the encrypted information.

The advantage of this method lies in the fact that the specific encryption key used to encrypt the information is itself permanently recorded with the associated encrypted information. In order to facilitate future access, and as will be described below, one or more safeguard copies of the recording transport key may be stored at another location than in the recorder.

In one embodiment, the information encrypted by the recording encryption key comprises control word information usable to descramble a scrambled data transmission also recorded on the support medium. Other embodiments are conceivable, for example, in which the encrypted information corresponds simply to transmitted data that will be ultimately read or displayed, e.g. the audiovisual information itself rather than a control word used to descramble it.

In one embodiment, the recording encryption key and/or recording transport key are stored on a portable security module associated with the recording means. This may comprise, for example, any convenient microprocessor and/or memory card device, such as a PCMCIA or PC card, a smart card, a SIM card etc. In alternative realizations, the keys may be stored in a security module permanently embodied in the recording means.

Unless explicitly limited to a portable or integrated device it is to be understood that all references to a "security module" cover both possible realizations.

In one embodiment, the transmitted information is encrypted prior to transmission and received by a decoder means before being communicated to the recording means.

The decoder may be physically separate or combine with the recording means. As will be explained in further detail below, the transmitted information may be in some cases processed and/or reencrypted by the decoder before being communicated to the recording means. The decoder means may itself be associated with a portable security module used to store transmission access control keys used to decrypt the transmitted encrypted information. In some embodiments, this may be distinct from the portable security module associated with the recording means. However, in the case of an integrated decoder/recorder, for example, the same security module may be used to hold all keys.

In one embodiment, the recording encryption key and/or recording transport key function in accordance with a first encryption algorithm and the transmission access control keys function in accordance with a second encryption algorithm.

For example, the recording encryption and transport keys may use the symmetric DES algorithm, whilst the transmission keys function in accordance with a customized algorithm, unique to the broadcast access control system. This enables the system manager to retain control over the algorithm chosen for the transmission keys whilst allowing a generic algorithm to be used for the keys relating to a recording.

In one embodiment, the recording transport key is generated at a central recording authorization unit and a copy of this key communicated to the recording means. In the event of loss or destruction of the key support associated with the recording means a backup copy or at least the means to generate the transport key will at all times be present at the central recording authorization unit.

For security reasons, the recording transport key is preferably encrypted by a farther encryption key prior to being communicated to the recording means. This further encryption key may be based, for example, on an encryption key common to all recorder security modules diversified by the serial number of the security module, such that only that security module can read the message.

In the case where the system comprises a receiver/decoder physically separate from the recording means it may be desirable for the recording means to possess the same access rights as the receiver/decoder, for example to permit the receiver/decoder to simply forward the data stream "as is" to the recorder for processing.

Accordingly, in one embodiment, a central access control system communicates transmission access control keys to a portable security module associated with the recording means. These may comprise, for example, a double of the keys normally held by the portable security module associated with the decoder and which are used to descramble transmissions.

In this embodiment, the recording means directly descrambles transmitted information using the transmission access keys prior to re-encryption of the information by the recording encryption key and storage on the support medium.

In a similar manner as with the communication of the transport key, the central access control system preferably encrypts the broadcast access control keys by a further encryption key prior to their communication to the recording means. This further encryption key may equally comprise an audience key common to all security modules diversified by the serial number of the recording means.

In order to enable the central access control system to correctly identify the broadcast access keys that need to be forwarded to the recording means, the recording means preferably sends a request to the central access control system including information identifying the broadcast access keys needed, the request of authentications by the recording means using a key unique to the recording means. This may correspond, for example, to the key used to encrypt communications from the central access control system to the recording means.

In the above realizations of the invention, a number of diverse embodiments have been described, in particular in which a central recording authorization unit generates and maintains a copy of the recording transport keys and in which a central access control system sends a duplicate set of transmission access control keys to the recording means. Alternative embodiments are possible. For example, in one embodiment comprising a decoder means and associated security module and a recording means and associated security module, a copy of the recording transport key is stored in the security module associated with either or both decoder means or recorder means. In this way, a backup key for decrypting a recording will always be available even in the event of destruction or loss of the other security module. In particular, a copy of the recording transport key may most usefully be stored in the decoder security module.

The recording transport key may be generated, for example, by the recording means security module and communicated to the decoder means security module or vice versa. For security reasons, the recording transport key is preferably encrypted before communication to the decoder security module and decrypted by a key unique to the security module receiving the recording transport key.

This unique key and its equivalent may be embedded in the respective security modules at the moment of their creation. However, alternatively, the decoder security module and recording security module carry out a mutual authorization process, the unique decryption key being passed to the other security module from the encrypting security module depending on the results of the mutual authorization.

In one embodiment, the mutual authorization step is carried out using, inter alia, an audience key known to both security modules. This may be, for example, a generic key known to all decoders and recorders and diversified by the serial number of each module.

In a further development of this double security module embodiment, the decoder means security module possesses transmission access control keys to decrypt the transmitted information in an encrypted form and a session key to re-encrypt the information prior to communication to the recording means security module, the recording means security module possessing an equivalent of the session key to decrypt the information prior to encryption by the recording transport key. This session key may be generated by the decoder means security module or recording means security module and communicated to the other module in encrypted form using an encryption key uniquely decryptable by the other security module.

The present invention extends to a recording means for use in the above method, a decoder means and a portable security module for use in each.

The terms "scrambled" and "encrypted" and "control word" and "key" have been used at various parts in the text for the purpose of clarity of language. However, it will be understood that no fundamental distinction is to be made between "scrambled data" and "encrypted data" or between a "control word" and a "key". Similarly, the term "equivalent key" is used to refer to a key adapted to decrypt data encrypted by a first mentioned key, or vice versa. Unless obligatory in view of the context or unless otherwise specified, no general distinction is made between keys associated with symmetric algorithms and those associated with public/private algorithms.

The term "receiver/decoder" or "decoder" used herein may connote a receiver for receiving either encoded or non-encoded signals, for example, television and/or radio signals, which may be broadcast or transmitted by some other means. The term may also connote a decoder for decoding received signals. Embodiments of such receiver/decoders may include a decoder integral with the receiver for decoding the received signals, for example, in a "set-top box," such a decoder functioning in combination with a physically separate receiver, or such a decoder including additional functions, such as a web browser or integrated with other devices such as a video recorder or a television.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on.

As used herein, the term "digital television system" includes for example any satellite, terrestrial, cable and other system.

BRIEF DESCRIPTION OF DRAWINGS

There will now be described, by way of example only, a number of embodiments of the invention, with reference to the following figures, in which:

FIG. 3 shows the encryption levels in the conditional access system;

FIG. 20 shows communication between a decoder card and recorder card.

DETAILED DESCRIPTION

Figure 1:
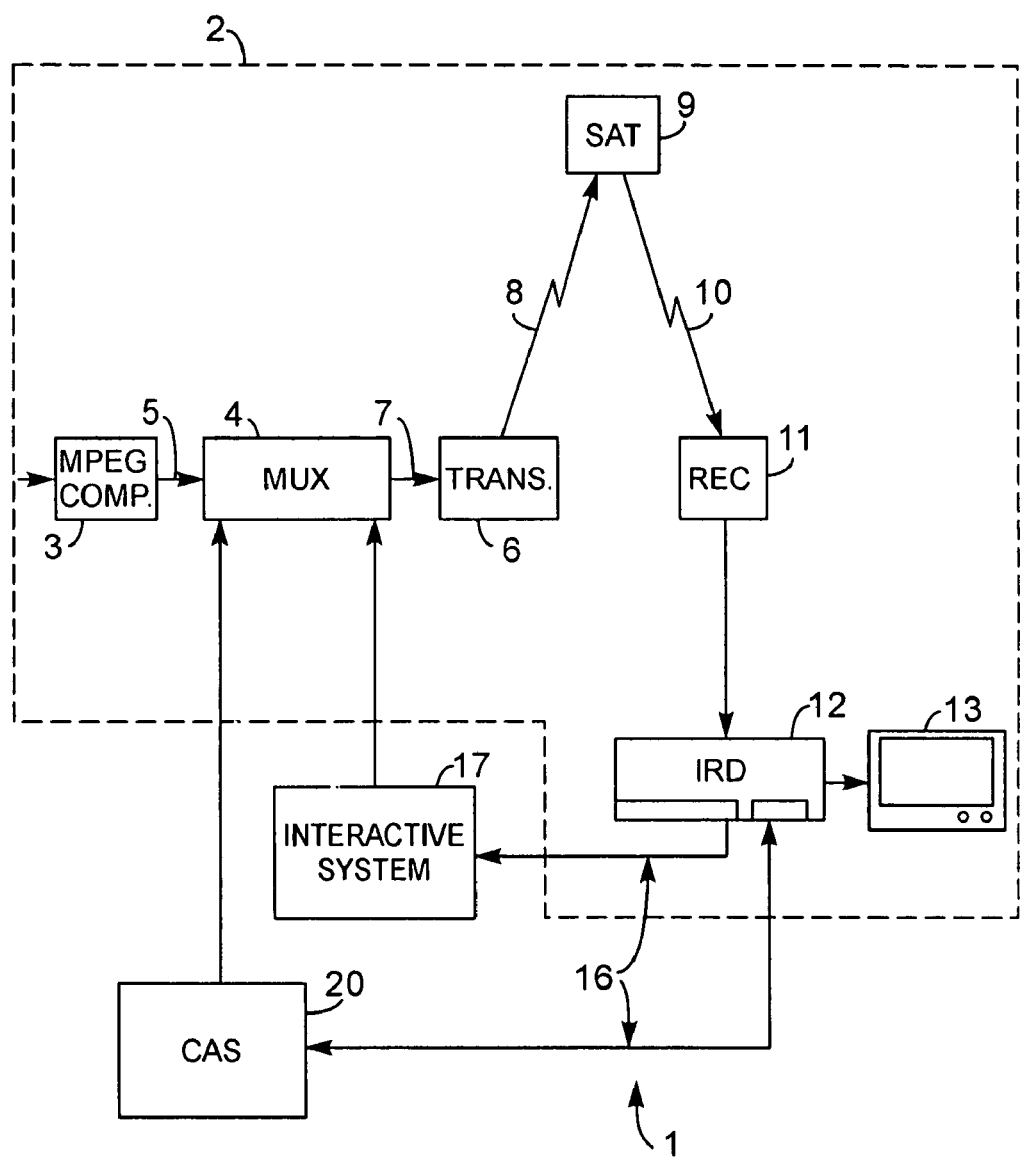
FIG. 1 shows the overall architecture of a digital TV system according to this embodiment.

Like elements in the various figures are denoted by like reference numerals for consistency.

An overview of a digital television broadcast and reception system 1 is shown in FIG. 1. The invention includes a mostly conventional digital television system 2 which uses the MPEG-2 compression system to transmit compressed digital signals. In more detail, MPEG-2 compressor 3 in a broadcast centre receives a digital signal stream (for example a stream of audio or video signals). The compressor 3 is connected to a multiplexer and scrambler 4 by linkage 5. The multiplexer 4 receives a plurality of further input signals, assembles one or more transport streams and transmit compressed digital signals to a transmitter 6 of the broadcast centre via linkage 7, which can of course take a wide variety of forms including telecom links.

The transmitter 6 transmit electromagnetic signals via uplink 8 towards a satellite transponder 9, where they are electronically processed and broadcast via a notional downlink 10 to earth receiver 11, conventionally in the form of a dish owned or rented by the end user. The signals received by receiver 11 are transmitted to an integrated receiver/decoder 12 owned or rented by the end user and connected to the end user's television set 13. The receiver/decoder 12 decodes the compressed MPEG-2 signal into a television signal for the television set 13.

A conditional access system 20 is connected to the multiplexer 4 and the receiver/decoder 12, and is located partly in the broadcast centre and partly in the decoder. It enables the end user to access digital television broadcasts from one or more broadcast suppliers. A smartcard, capable of decrypting messages relating to commercial offers (that is, one or several television programs sold by the broadcast supplier), can be inserted into the receiver/decoder 12. Using the decoder 12 and smartcard, the end user may purchase events in either a subscription mode or a pay-per-view mode.

An interactive system 17, also connected to the multiplexer 4 and the receiver/decoder 12 and again located partly in the broadcast centre and partly in the decoder, may be provided to enable the end user to interact with various applications via connected back channel 16.

Figure 2:
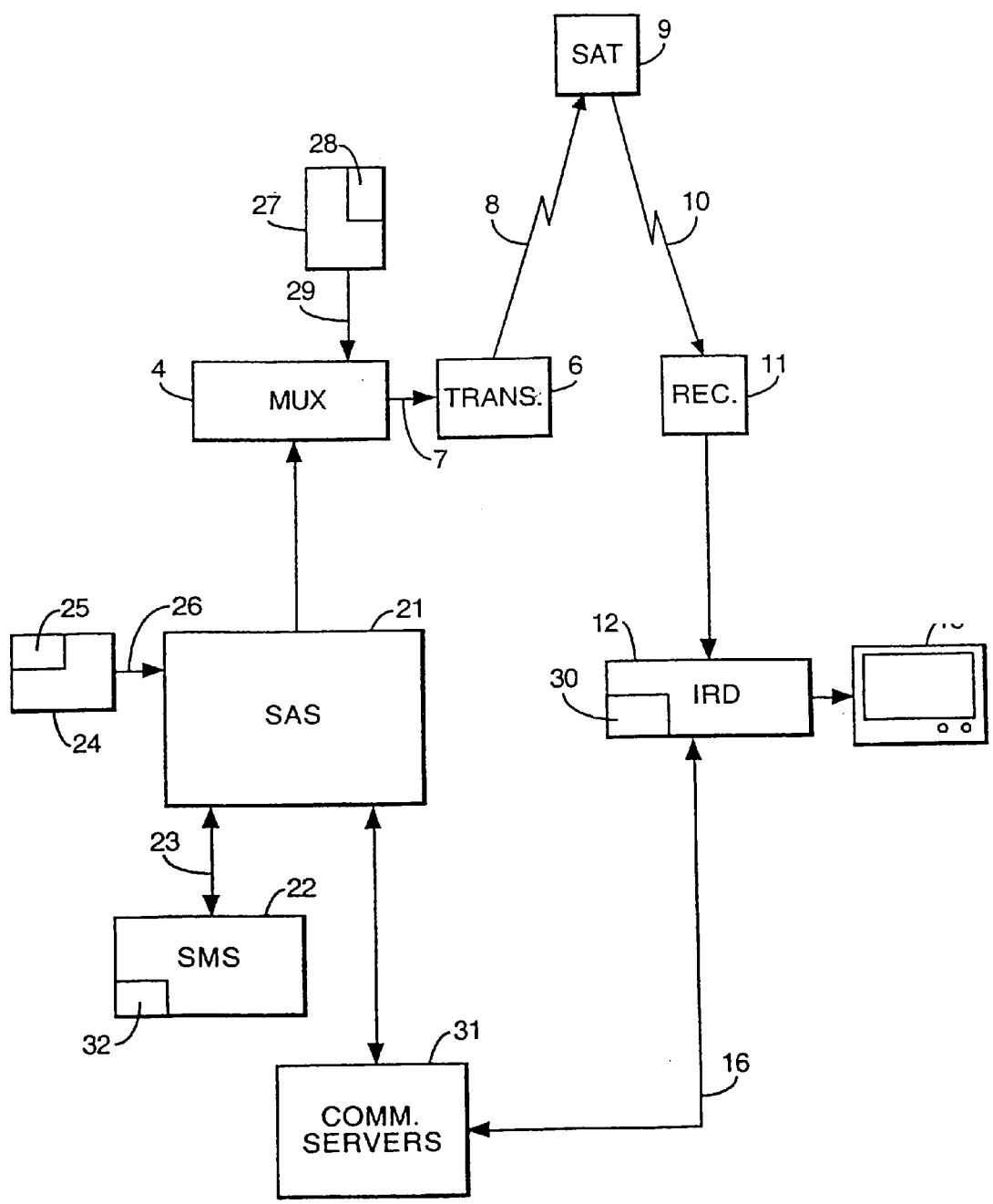
FIG. 2 shows the architecture of the conditional access system of FIG. 1.

The conditional access system 20 will now be described in more detail. With reference to FIG. 2, in overview the conditional access system 20 includes a Subscriber Authorization System (SAS) 21. The SAS 21 is connected to one or more Subscriber Management Systems (SMS) 22, one SMS for each broadcast supplier, by a respective TCP-IP linkage 23 (although other types of linkage could alternatively be used). Alternatively, one SMS could be shared between two broadcast suppliers, or one supplier could use two SMSs, and so on.

First encrypting units in the form of ciphering units 24 "mother" smartcards 25 are connected to the SAS by linkage 26. Second encrypting units again in the form of ciphering units 27 utilizing mother smartcards 28 are connected to the multiplexer 4 by linkage 29. The receiver/decoder 12 receives a portable security module, for example in the form of "daughter" smartcard 30. It is connected directly to the SAS 21 by Communications Servers 31 via the connected back channel 16. The SAS sends, amongst other things, subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 24 and 27 comprise a rack, an electronic VME card with software stored on an EEPROM, up to 20 electronic cards and one smartcard 25 and 28 respectively, for each electronic card, one card, 28 for encrypting the ECMs and one card 25 for encrypting the EMMS.

The operation of the conditional access system 20 of the digital television system will now be described in more detail with reference to the various components of the television system 2 and the conditional access system 20.

Multiplexer and Scrambler

With reference to FIGS. 1 and 2, in the broadcast centre, the digital audio or video signal is first compressed (or bit rate reduced), using the MPEG-2 compressor 3. This compressed signal is then transmitted to the multiplexer and scrambler 4 via the linkage 5 in order to be multiplexed with other data, such as other compressed data.

The scrambler generates a control word used in the scrambling process and included in the MPEG-2 stream in the multiplexer. The control word is generated internally and enables the end user's integrated receiver/decoder 12 to descramble the program.

Access criteria, indicating how the program is commercialized are also added to the MPEG-2 stream. The program may be commercialized in either one of a number of "subscription" modes and/or one of a number of "Pay Per View" (PPV) modes or events. In the subscription mode, the end user subscribes to one or more commercial offers, or "bouquets," thus getting the rights to watch every channel inside those bouquets. In the preferred embodiment, up to 960 commercial offers may be selected from a bouquet of channels.

In the Pay Per View mode, the end user is provided with the capability to purchase events as he wishes. This can be achieved by either pre-booking the event in advance ("prebook mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Entitlement Control Messages

Both the control word and the access criteria are used to build an Entitlement Control Message (ECM). This is a message sent in relation with a scrambled program; the message contains a control word (which allows for the descrambling of the program) and the access criteria of the broadcast program. The access criteria and control word are transmitted to the second encrypting unit 27 via the linkage 29. In this unit, an ECM is generated, encrypted and transmitted on to the multiplexer and scrambler 4. During a broadcast transmission, the control word typically changes every few seconds, and so ECMs are also periodically transmitted to enable the changing control word to be descrambled. For redundancy purposes, each ECM typically includes two control words; the present control word and the next control word.

Each service broadcast by a broadcast supplier in a data stream comprises a number of distinct components; for example a television program includes a video component, an audio component, a sub-title component and so on. Each of these components of a service is individually scrambled and encrypted for subsequent broadcast to the transponder 9. In respect of each scrambled component of the service, a separate ECM is required. Alternatively, a single ECM may be required for all of the scrambled components of a service. Multiple ECMs are also generated in the case where multiple conditional access systems control access to the same transmitted program.

Entitlement Management Messages (EMMs)

The EMM is a message dedicated to an individual end user (subscriber), or a group of end users. Each group may contain a given number of end users. This organization as a group aims at optimizing the bandwidth; that is, access to one group can permit the reaching of a great number of end users.

Various specific types of EMM can be used. Individual EMMs are dedicated to individual subscribers, and are typically used in the provision of Pay Per View services; these contain the group identifier and the position of the subscriber in that group.

Group subscription EMMs are dedicated to groups of, say, [256] individual users, and are typically used in the administration of some subscription services. This EMM has a group identifier and a subscribers' group bitmap.

Audience EMMs are dedicated to entire audiences, and might for example be used by a particular operator to provide certain free services. An "audience" is the totality of subscribers having smartcards which bear the same conditional access system identifier (CAID). Finally, a "unique" EMM is addressed to the unique identifier of the smartcard.

EMMs may be generated by the various operators to control access to rights associated with the programs transmitted by the operators as outlined above. EMMs may also be generated by the conditional access system manager to configure aspects of the conditional access system in general.

Program Transmission

The multiplexer 4 receives electrical signals comprising encrypted EMMs from the SAS 21, encrypted ECMs from the second encrypting unit 27 and compressed program from the compressor 3. The multiplexer 4 scrambles the program and sends the scrambled program, the encrypted EMMs and the encrypted ECMs to a transmitter 6 of the broadcast centre via the linkage 7. The transmitter 6 transmit electromagnetic signals towards the satellite transponder 9 via uplink 8.

Program Reception

The satellite transponder 9 receives and processes the electromagnetic signals transmitted by the transmitter 6 and transmit the signals on to the earth receiver 11, conventionally in the form of a dish owned or rented by the end user, via downlink 10. The signals received by receiver 11 are transmitted to the integrated receiver/decoder 12 owned or rented by the end user and connected to the end user's television set 13. The receiver/decoder 12 demultiplexes the signals to obtain scrambled program with encrypted EMMs and encrypted ECMs.

If the program is not scrambled, that is, no ECM has been transmitted with the MPEG-2 stream, the receiver/decoder 12 decompresses the data and transforms the signal into a video signal for transmission to television set 13.

If the program is scrambled, the receiver/decoder 12 extracts the corresponding ECM from the MPEG-2 stream and passes the ECM to the "daughter" smartcard 30 of the end user. This slots into a housing in the receiver/decoder 12. The daughter smartcard 30 controls whether the end user has the right to decrypt the ECM and to access the program. If not, a negative status is passed to the receiver/decoder 12 to indicate that the program cannot be descrambled. If the end user does have the rights, the ECM is decrypted and the control word extracted. The decoder 12 can then descramble the program using this control word. The MPEG-2 stream is decompressed and translate into a video signal for onward transmission to television set 13.

Subscriber Management System (SMS)

A Subscriber Management System (SMS) 22 includes a database 32 which manages, amongst others, all of the end user files, commercial offers, subscriptions, PPV details, and data regarding end user consumption and authorization. The SMS may be physically remote from the SAS.

Each SMS 22 transmit messages to the SAS 21 via respective linkage 23 which imply modifications to or creations of Entitlement Management Messages (EMMs) to be transmitted to end users.

The SMS 22 also transmit messages to the SAS 21 which imply no modifications or creations of EMMs but imply only a change in an end user's state (relating to the authorization granted to the end user when ordering products or to the amount that the end user will be charge).

The SAS 21 sends messages (typically requesting information such as call-back information or billing information) to the SMS 22, so that it will be apparent that communication between the two is two-way.

Subscriber Authorization System (SAS)

The messages generated by the SMS 22 are passed via linkage 23 to the Subscriber Authorization System (SAS) 21, which in turn generates messages acknowledging receipt of the messages generated by the SMS 21 and passes these acknowledgements to the SMS 22.

In overview the SAS comprises a Subscription Chain area to give rights for subscription mode and to renew the rights automatically each month, a Pay Per View Chain area to give rights for PPV events, and an EMM Injector for passing EMMs created by the Subscription and PPV chain areas to the multiplexer and scrambler 4, and hence to feed the MPEG stream with [EMMS.] If other rights are to be granted, such as Pay Per File (PPF) rights in the case of downloading computer software to a user's Personal Computer, other similar areas are also provided.

One function of the SAS 21 is to manage the access rights to television programs, available as commercial offers in subscription mode or sold as PPV events according to different modes of commercialization (pre-book mode, impulse mode). The SAS 21, according to those rights and to information received from the SMS 22, generates EMMs for the subscriber.

The EMMs are passed to the Ciphering Unit [(CU)] 24 for ciphering with respect to the management and exploitation keys. The CU completes the signature on the EMM and passes the EMM back to a Message Generator (MG) in the SAS 21, where a header is added. The EMMs are passed to a Message Emitter (ME) as complete EMMS. The Message Generator determines the broadcast start and stop time and the rate of emission of the EMMS, and passes these as appropriate directions along with the EMMs to the Message Emitter. The MG only generates a given EMM once; it is the ME which performs cyclic transmission of the EMMS.

On generation of an EMM, the MG assigns a unique identifier to the EMM. When the MG passes the EMM to the ME, it also passes the EMM ID. This enables identification of a particular EMM at both the MG and the ME.

In systems such as simulcrypt which are adapted to handle multiple conditional access systems e.g. associated with multiple operators, EMM streams associated with each conditional access system are generated separately and multiplexed together by the multiplexer 4 prior to transmission.

Encryption Levels of the System

Referring now to FIG. 3, a simplified outline of the encryption levels in the broadcast system will now be described. The stages of encryption associated with the broadcast of the digital data are shown at 41, the transmission channel (e.g. a satellite link as described above) at 42 and the stages of decryption at the receiver at 43.

The digital data N is scrambled by a control word CW before being transmitted to a multiplexer [MP] for subsequent transmission. As will be seen from the lower part of FIG. 3, the transmitted data includes an ECM comprising, inter alia, the control word CW as encrypted by an encrypter Ch1 controlled by a first encryption key KEX. At the receiver/decoder, the signal passes by a demultiplexer DMp and descrambler D before being passed to a television 2022 for viewing. A decryption unit DCh1 also possessing the key Kex decrypts the ECM in the demultiplexed signal to obtain the control word CW subsequently used to descramble the signal.

For security reasons, the control word CW embedded in the encrypted ECM changes on average every 10 seconds or so. In contrast, the first encryption key Kex used by the receiver to decode the ECM is changed every month or so by means of an operator EMM. The encryption key Kex is encrypted by a second unit ChP using a personalized group key K1(GN). If the subscriber is one of those chosen to receive an updated key Kex, a decryption unit DCHP in the decoder will decrypt the message using its group key K1(GN) to obtain that month's key KEX.

The decryption units DChp and DCh1 and the associated keys are held on a smart card provided to the subscriber and inserted in a smart card reader in the decoder. The keys may be generated, for example, according to any generally used symmetric key algorithm or in accordance with a customized symmetric key algorithm.

As will be described, different keys may be associated with different operators or broadcasters as well as with the conditional access system supplier. In the above description, a group key K1(GN) is held by the smart card associated with the decoder and used to decrypt EMM messages. In practice, different operators will have different subscriber unique keys K1(Op1, GN), KI(Op2, GN) etc. Each group key is generated by an operator and diversified by a value associated with the group to which the subscriber belongs. Different memory zones in the smart card hold the keys for different operators. Each operator may also have a unique key associated solely with the smart card in question and an audience key for all subscribers to the services provided by that operator (see above).

In addition, a set of keys may also be held by the manager of the conditional access system. In particular, a given smart card may include a user specific key KO(NS) and an audience key K1 (C), common to all smart cards. Whilst the operator keys are generally used to decode EMM messages associated with broadcast rights, the conditional access manager keys may be used to decrypt EMM messages associated with changes to conditional access system in general, as will be described below.

Figure 4:
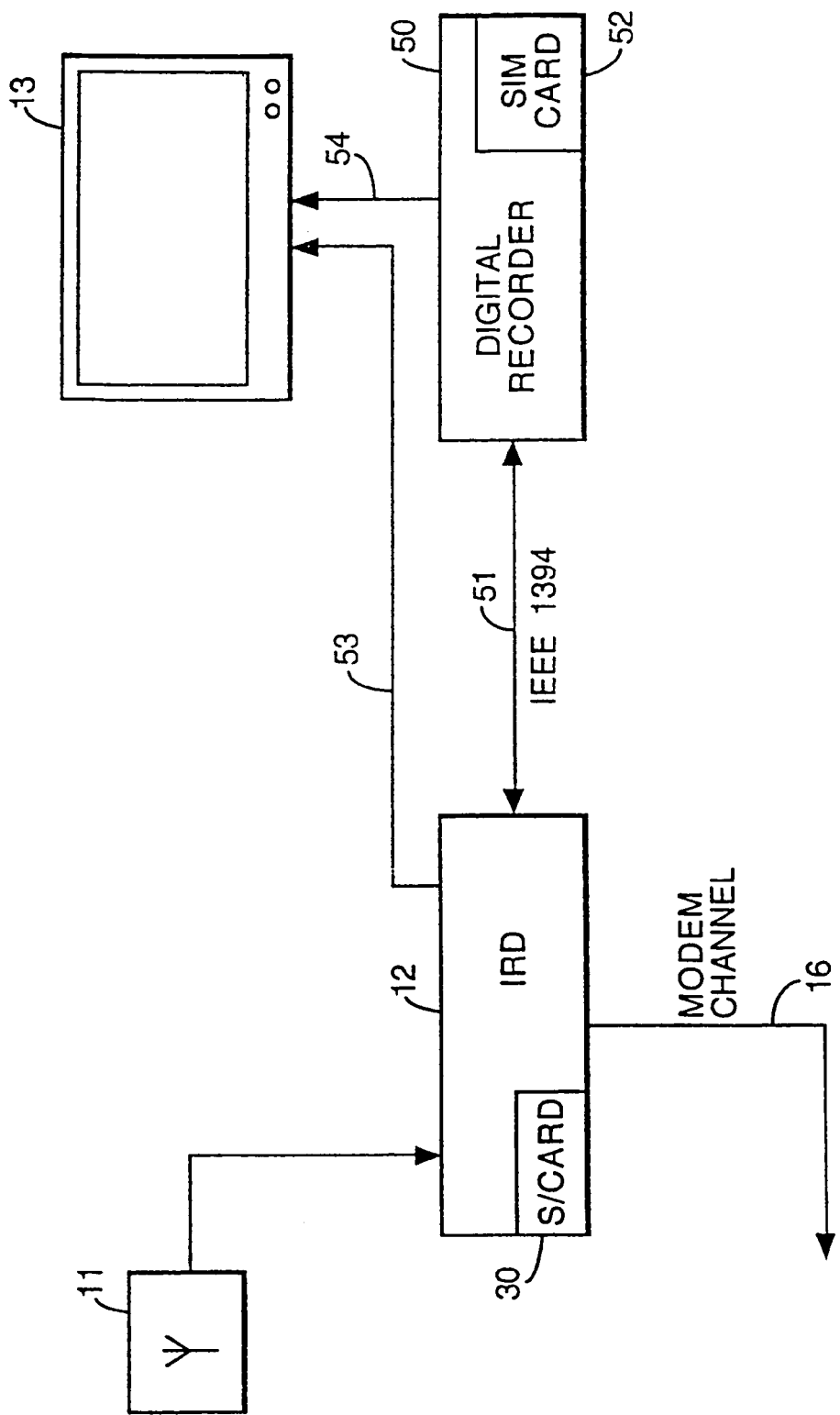
FIG. 4 shows the layout of a decoder and digital recording device according to this embodiment.

The above description of the system shown in FIG. 3 relates to the implementation of access control in a broadcast system in which transmissions are descrambled by a decoder and displayed immediately. Referring to FIG. 4, the elements of an access control system for recording and replaying of scrambled transmission will now be described.

As before, a decoder 12 receives scrambled broadcast transmissions via a receiver 11. The decoder includes a portable security module 30, which may conveniently take the form of a smart card, but which may comprise any other suitable memory or microprocessor device. The decoder 12 includes a modem channel 16, for example, for communicating with servers handling conditional access information and is also adapted to pass descrambled audiovisual display information, e.g. via a Peritel link 53, to a television 13. The system additionally includes a digital recorder 50, such as a DVHS or DVD recorder, adapted to communicate with the decoder, for example, via an IEEE 1394 bus 51. The recorder 50 receives a digital support (not shown) on which information is recorded.

The recorder 50 is further adapted to function with a portable security module 52 containing, inter alia, the keys used to control access to the replaying of a recording. The portable security module may comprise any portable memory and/or microprocessor device as is conventionally known, such as a smart card, a PCMCIA card, a microprocessor key etc. In the present case, the portable security module 52 has been designated as a SIM card, known from the field of portable telephones.

The digital recorder 50 includes a direct link 54 to the display 13. In alternative realizations, digital audiovisual information may be passed from the recorder 50 to the decoder 12 prior to display. Equally, whilst the elements of decoder 12, recorder 50 and display 13 have been indicated separately, it is conceivable that some or all of these elements may be merged, for example, to provide a combine decoder/television set or combine decoder/recorder etc.

Similarly, whilst the invention will be discussed in relation to the recording of audiovisual broadcast information, it may also conveniently be applied, for example, to broadcast audio information subsequently recorded on a DAT or minidisc recorder or even a broadcast software application recorded on the hard disc of a computer.

A first and second embodiment of the invention will now be described with reference to FIGS. 5 to 11 and 12 to 19, respectively. In the first embodiment a central server is used to handle the generation and safeguard of the keys permitting access to a recording. Furthermore, in this embodiment, the real time decryption and descrambling of a broadcast is carried out by the SIM card of the recorder prior to recording. In the second embodiment, the decoder smart card manages the safeguard of recording access keys and also plays a part in the real time decryption and decoding of broadcast transmissions.

First Embodiment

Figure 5:
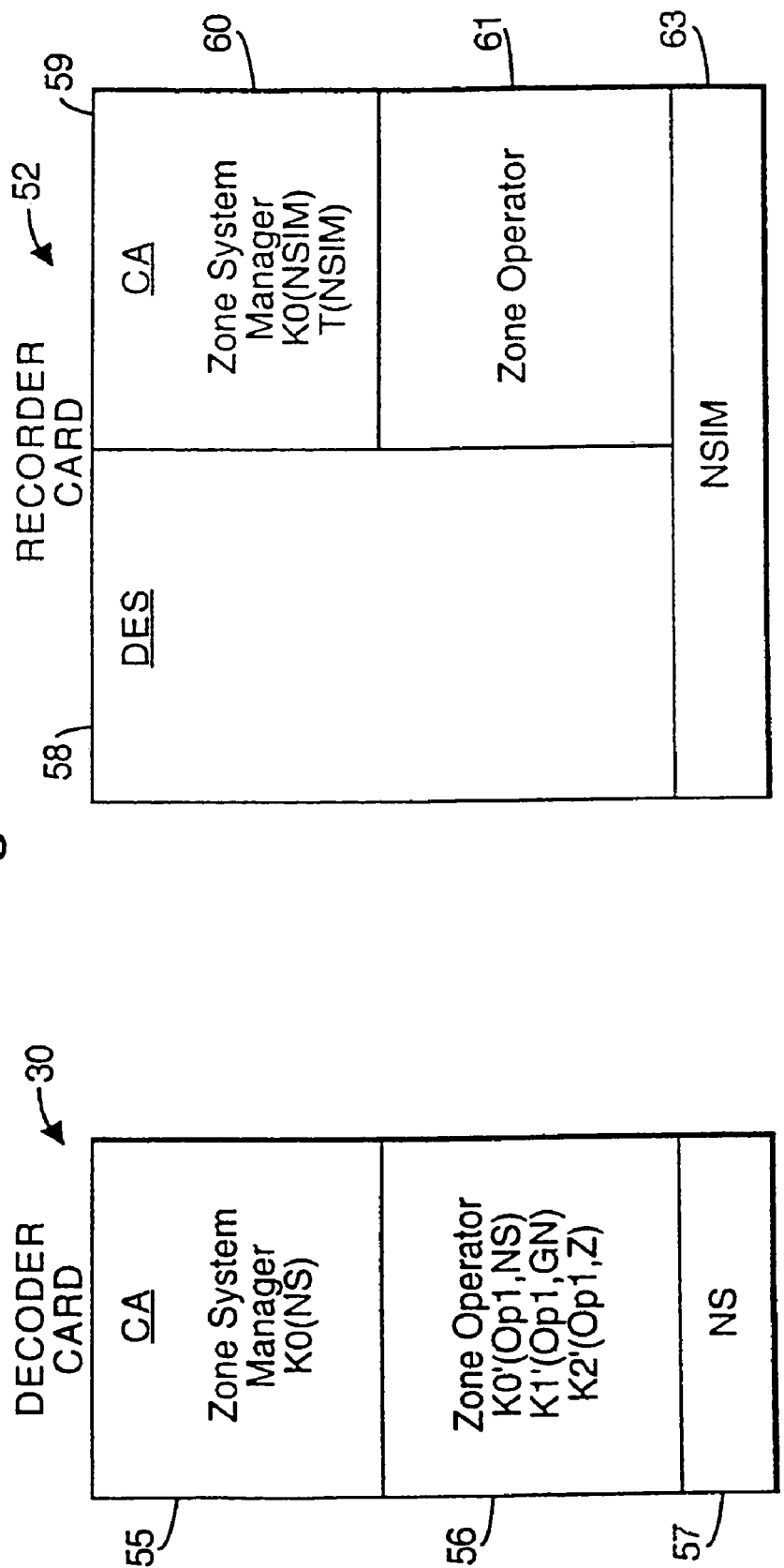
FIG. 5 shows in schematic form the organization of zones within the memory cards associated with the decoder and recorder of FIG. 4.

Referring to FIG. 5, the structure of the memory zones in the smart card 30 and SIM card 52 associated with the decoder and recorder, respectively, will now be described.

As shown, the decoder smart card 30 includes a number of keys adapted to function with a symmetric encryption/decryption algorithm associated with the conditional access system. In the present example, a custom algorithm "CA" is used for operations generally associated with access to the broadcast transmission. This is to distinguish from the operations carried out by the SIM card 52 using the DES algorithm and which are generally associated with the recording and playback of information on the digital support (see below).

The first set of keys, associated with the conditional access system manager indicated in the zone 55, are implanted in the smart card at the moment of personalization. These keys include a key KO diversified by a number NS unique to that card. The system manager zone 55 may also include other keys, such as an audience key K1 (not shown) diversified by a constant C and common to all smart cards handled by the conditional access system manager.

A second zone 56 contains the keys associated with one or more broadcast operators. These keys may be implanted at the moment of personalization of the card 30 by the conditional access system manager but are more usually created by means of a special transmitted EMM message at the start up of a decoder.

As mentioned above, the operator keys may typically include a KO' diversified by a number NS unique to that card, a group key K1' diversified by a group number GN and an audience key K2' diversified by a constant Z and common to all subscriber card addressed by that operator.

Finally, the smart card includes the value of the unique number NS of that card, implanted at the moment of personalization and held in the zone 57 of the smart card memory.

As is shown, the SIM card 52 associated with the digital recorder includes two sections 58,59 associated with keys and operations carried out using the CA and DES algorithms, respectively. The section 59 associated with operations using the CA algorithm includes a first system manager zone 60 and an operator zone 61. The keys, in the system manager zone are implanted in the card at the moment of personalization by the conditional access system manager and include a key KO diversified by the serial number NSIM of the SIM card as well as a communications transport key T also diversified by the serial number NSIM of the card. Both keys are unique to the SIM card in question.

The SIM card further includes an operator zone 61 adapted to store keys associated with one or more operators. In the present FIG. 5, the SIM card is shown as it is at the moment of its creation and personalization by the conditional access system manager and before insertion in a recorder. For this reason, both the operator zone 61 and the DES zone 58 are shown as blank, i.e. without any stored keys.

Finally, the SIM card includes a zone 63 adapted to hold the unique SIM card serial number NSIM.

As mentioned above, in this embodiment, the recorder SIM card 52 is adapted to handle the real time decryption and descrambling of broadcast data autonomously and independent of the smart card 30 associated with the decoder. In order to carry out these operations, it is necessary for the recorder SIM card 52 to possess a double of the keys usually held in the system manager and operator zones 55,56 of the decoder smart card (see FIG. 5). As will be described, once the necessary keys are installed in the recorder SIM card 52, the decoder 12 will thereafter pass the broadcast transmission stream "as is" to the digital recorder 50 and card 52.

In this embodiment, the generation of duplicate broadcast related keys is managed by the central conditional access system 21, the digital recorder 50 acting to transmit a request to the appropriate server, e.g., via the modem link provided by the decoder 12. Alternatively, it may be envisage that the recorder itself will be equipped with a modem to carry out this request. In this embodiment, the central conditional access system serves to regulate both transmission access control keys and, as will be described recording access control keys. In order to enable the central conditional access system server to generate a double of the keys associated with the decoder smart card it is necessary that the request message from the recorder SIM card includes an identification of the identity of the decoder smart card (e.g. the smart card serial number NS) as well as providing secured confirmation of its own identity.

As a first step therefore, the decoder smart card 30 communicates its serial number NS and a list of operators Op1, Op2 etc. to the SIM card 52. For reasons of security, this communication may itself be encrypted by a simple transport encryption algorithm applied to all communications between the decoder 12 and recorder 50. To avoid unnecessary complexity in the Figures, the keys associated with this encryption are not shown. The decoder card serial number NS is then stored in the system manager zone of the SIM card.

The recorder SIM card 52 then sets up a communication with the conditional access system 21 and requests the unique number NMERE of the conditional access system 21 at the conditional access server (see FIG. 2). Using the information thus obtained, the recorder SIM card 52 generates a message using the CA algorithm, as shown in FIG. 6.

In the convention adopted in the accompanying drawings, the symmetric algorithm to be used in a given cryptographic step (CA or DES) is identified within an oval. The data to be encrypted and/or the data serving as a diversifier is identified as arriving via a blacked out input to the oval. See the encryption of the smart card number and operator list at 70 in FIG. 6. Decryption steps are distinguished using an inverse power sign, for example $CA^{-1}$ or $DES^{-1}$.

Figure 6:
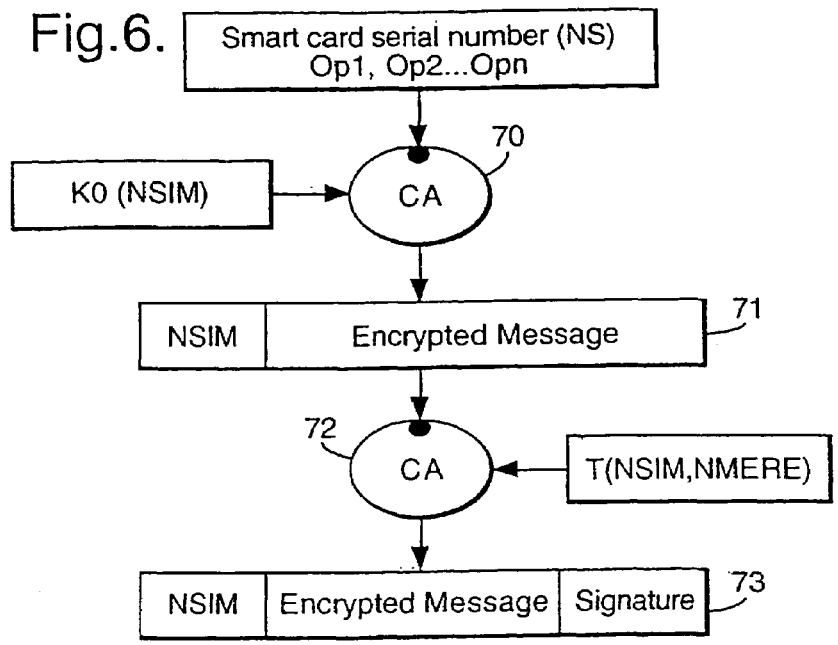
FIGS. 6 and 7 show the steps in the preparation of messages for communication between the decoder card and a centralized server in this first embodiment.

As a first step in FIG. 6, the smart card number NS and operator list are encrypted by the key [KO] (NSIM) as shown at 70 to generate a message 71 comprising the SIM card serial number NSIM and the encrypted data. At a second step 72, the encrypted data is again re-encrypted by the key T (NSIM, NMERE), created by diversifying the key T (NSIM) by a unique value NMERE associated with the conditional access system. As will be understood, the steps 70,71 may be carried out in the inverse order. The message 73 and signature thus formed are then sent to the conditional access server 21, ciphering unit 24 and mother card 25.

Figure 7:
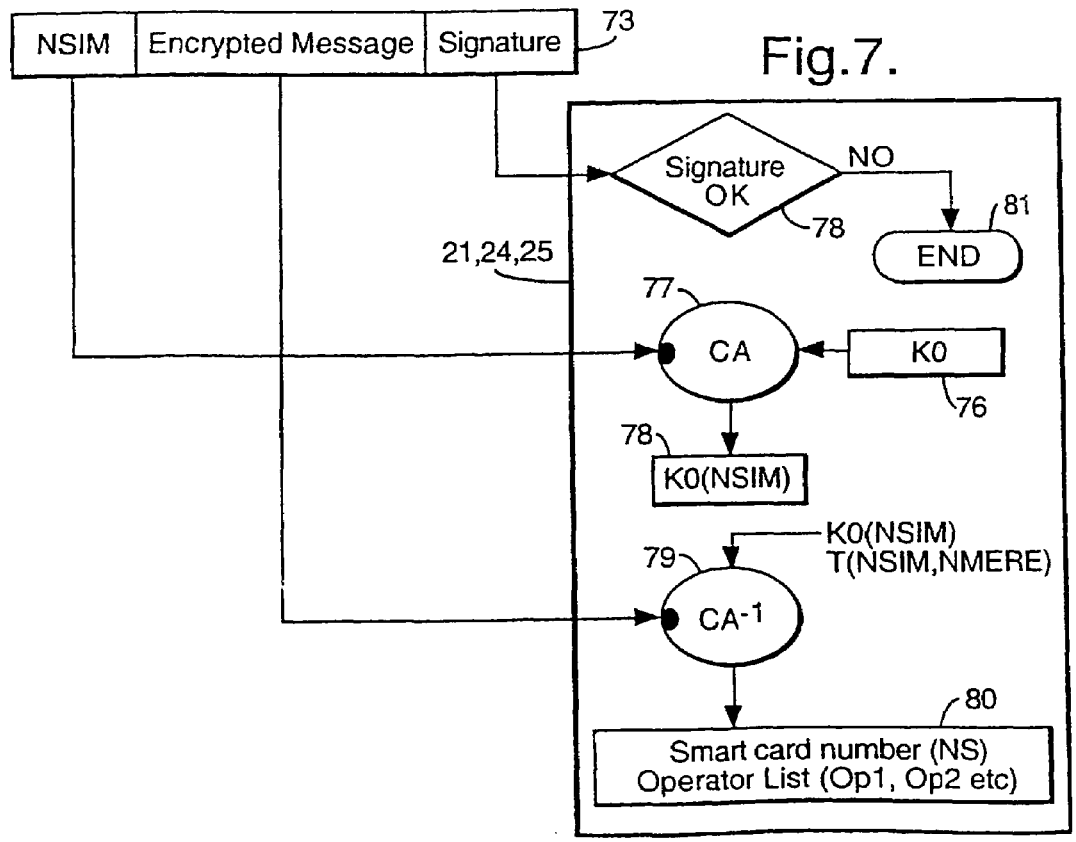

The conditional access system 21 decrypts the message as shown in FIG. 7. The system possesses the original key [KO] shown at 76. Diversifying the key KO with the NSIM value contained in the message, as shown at 77, generates the key KO (NSIM). The key KO (NSIM) is first used to validate the signature at 78. In the event that the signature is not valid, the analysis of the message ends, as shown at 81.

In addition to the key K0, the system also possesses the transport key T or at least the key T (NMERE) representing the value of this key T diversified by unique conditional access system number NMERE. Diversifying T (NMERE) by the value NSIM contained in the message enables the system to generate the key T (NSIM, NMERE). For the sake of simplicity, the steps in the preparation of this key have not been shown in FIG. 7.

Equipped with keys KO (NSIM) and T (NSIM, NMERE), the system manager can then decrypt the message at 79 to obtain the decoder smart card serial number NS and the list of operators associated with the subscriber in question. The system manager then further verifies that the list of operators does indeed match the smart card serial number and thereafter assembles in an EMM message the duplicate key values that will be needed by the recorder SIM card to decrypt a transmission, including a duplicate of the smart card system manager key KO(NS) as well as the various operator keys K0' (Op1, NS), K1' (Op1, GN) etc.

The access system also prepares a recording transport key RT (A) which will be subsequently used by the SIM card in controlling access during the recording and playback of a digital recording, as will be discussed in more detail below. In accordance with the choice of algorithm preferred for dealing with the recording, this key will be prepared from a DES key RT diversified by a random number A. The key RT is always present in the mother card and a copy of the value A is maintained for safeguard purposes in a database associated with the system operator. In this way, the value RT (A) may be regenerated at any moment.

The smart card duplicate keys KO(NS), K0'(Op1, NS), Kex etc. and the recording transport key RT (A) are then formatted into an EMM message sent to the recorder SIM card. For security reasons, this message is encrypted by the key KO (NSIM) to ensure that only the correct SIM card can obtain this information.

For any subsequent change or update, for example, in relation to the operator keys or other access rights, the SIM card (as a copy of the smart card) will receive all EMM/ECM messages needed to decrypt broadcast transmissions.

Figure 8:
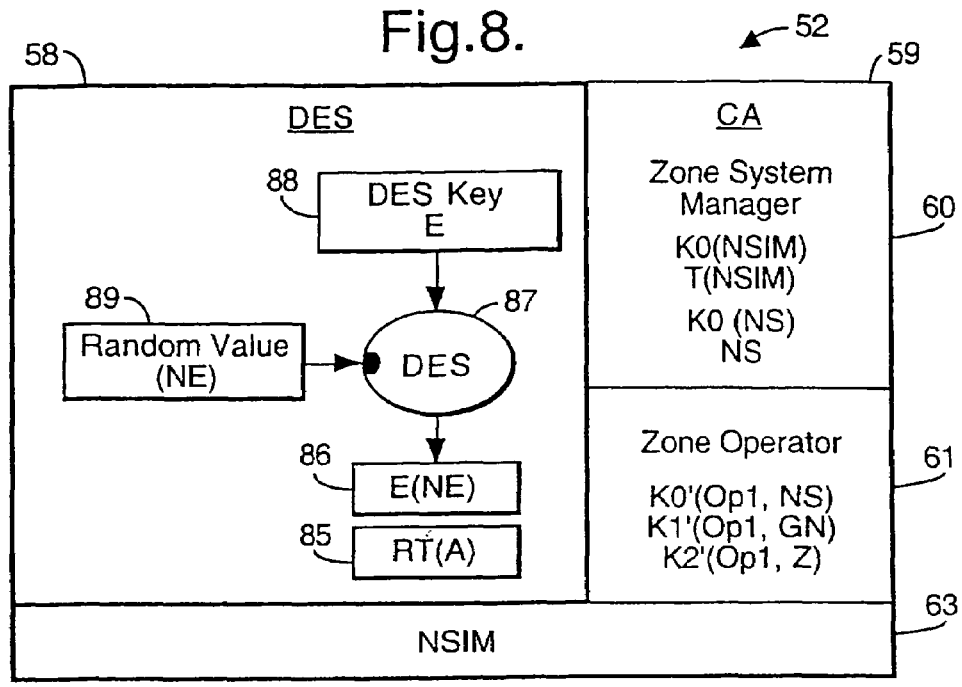
FIG. 8 shows the cryptology architecture of the decoder card in generating a recording encryption key according to this first embodiment.

Referring to FIG. 8, the state of the recorder SIM card 52 immediately prior to the recording of a broadcast transmission will now be described. As shown, the digital recorder card 59 now includes complete system manager and operator zones 60,61 as well as a stored value the DES recording transport key RT (A) shown at 85. In addition, the card generates a recording encryption key E (NE) shown at 86 and obtained by diversifying at 87 a DES key E shown at 88 by a random value NE shown at 89. In this case, the key E (NE) is used as a type of session key and may be changed between recordings. The pair of keys E (NE) and RT (A) will subsequently be used in all encryption and decryption of the digital recording.

Figure 9:
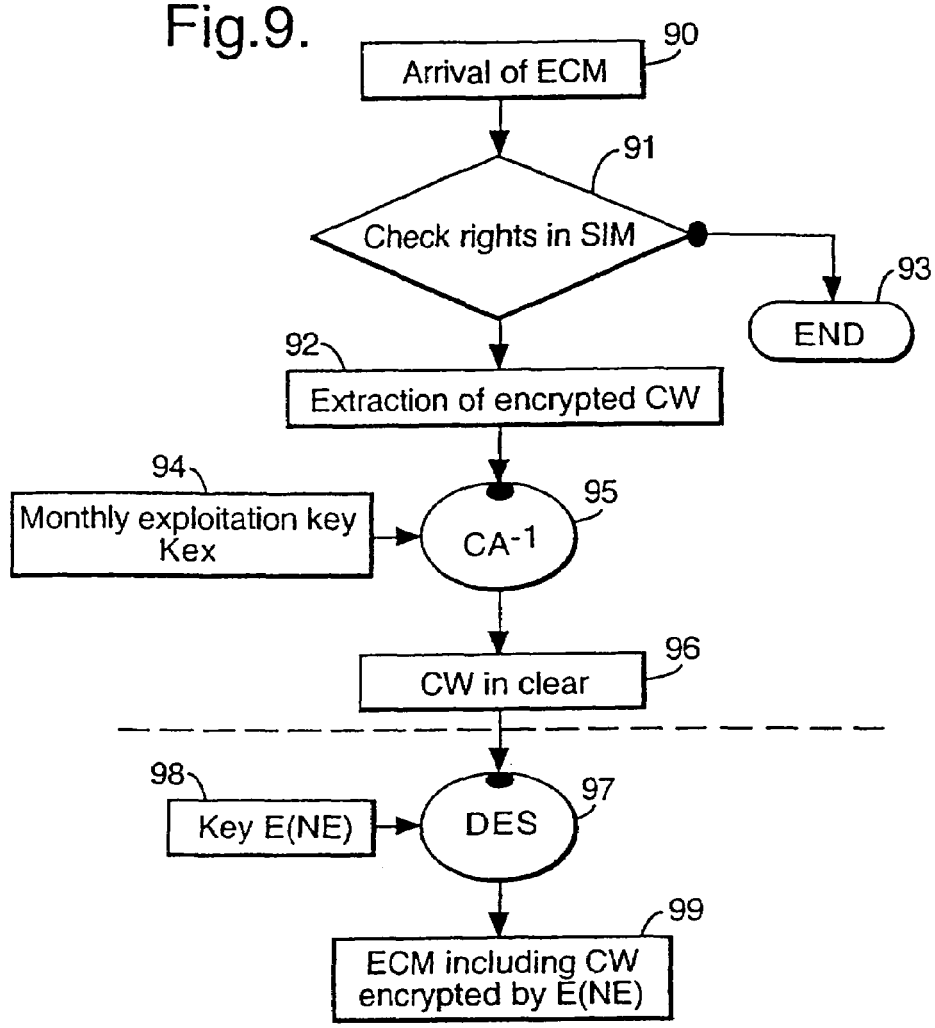
FIGS. 9 and 10 show the preparation of ECM and EMM messages for recording on the digital recording support according to this first embodiment.

Referring to FIG. 9, the steps in the treatment by the recorder of an ECM message associated with a broadcast transmission will now be described. After the arrival of an ECM message at 90, the card verifies at 91 that it has the rights to read this particular transmission, for example, that it is a transmission from one of the operators in its list of operators. If so, the encrypted control word CW is extracted from the ECM at the step 92. If not, the processing stops at step 93. Using that month's exploitation key Kex for the operator in question shown at 94, the card decodes at 95 the encrypted value to obtain the control word CW in clear, as shown at 96. The recorder card then re-encrypts at 97 the control word CW using the DES key E (NE) shown at 98 and prepares an ECM including the newly encrypted control word for insertion in the data stream to replace the previous ECM. The scrambled transmission together with the sequence of new ECM messages are then recorded on the support in the digital recorder.

Figure 10:
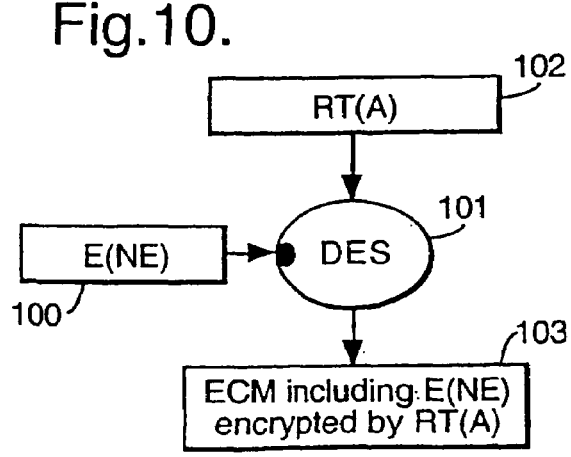

Simultaneously and as shown at step 101 in FIG. 10, the SIM recorder card encrypts the value E (NE) shown at 100 using the recording transport key RT (A) shown at 102, so as to generate a special EMM type message 103. This EMM message is then recorded on the digital recording support at the start or header of the recording. As will be understood from the foregoing description, other than the safeguard copy held at the conditional access system database, the key RT (A) is unique to the recorder card and this EMM message may not be decrypted by cards other than the recorder card that generated the message.

Figure 11:
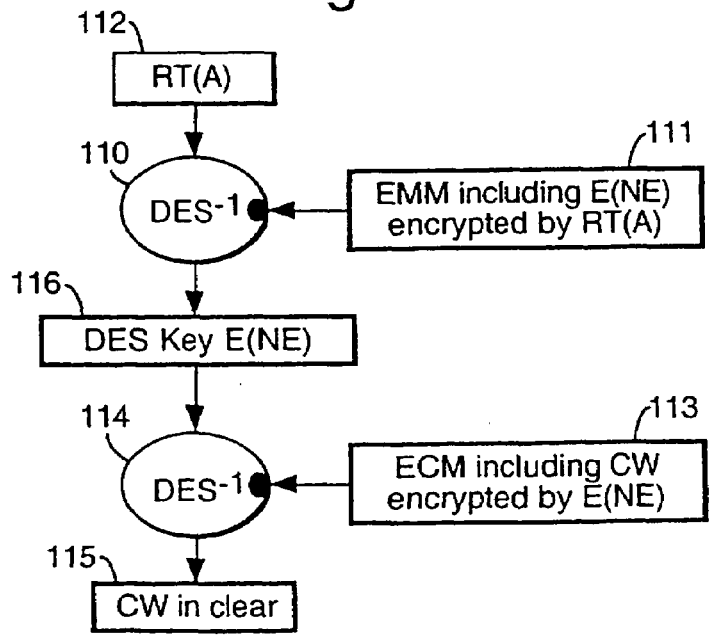
FIG. 11 shows the decryption steps associated with the replay of a recording in this first embodiment.

Referring to FIG. 11, the steps in the decryption and descrambling of a recording will now be described. Firstly, the EMM message 111 at the head of the recording is decrypted at 110 using the recording transport key 112 stored in the SIM card. Assuming the EMM message was originally created using the same recording transport key the result of the decryption step 110 will be the recording encryption key E (NE) at 116.

As the recording is played, ECMs 113 are picked out from the data stream and decrypted at step 114 using the recording encryption key E (NE) to obtain at step 115 the control word CW used to scramble that part of the data stream associated with the ECM. This control word CW is then fed together with the scrambled audiovisual data to a descrambling unit, either in the recorder SIM card or in the recorder itself, and a descrambled audiovisual output obtained for subsequent display via the television display or the like.

As will be understood, the presence of a safeguard means for preparing a copy of the transport key RT (A) at the mother card 25 of the central access control system means that, in the event of loss or destruction of the recorder SIM card 25, it will be possible to reconstruct a new recorder card to allow playback of previously made recordings.

The above embodiment is particularized by the fact that the recording transport key RT (A) is generated and safeguarded at a central server and also by the fact that the recorder SIM card contains a duplicate of the necessary operator keys to independently decrypt and descramble a real time transmission. The second embodiment, described below in FIGS. 12 to 19 does not suffer from these constraints, but describes a realization in which the decoder smart card plays a more important role.

Second Embodiment

Figure 12:
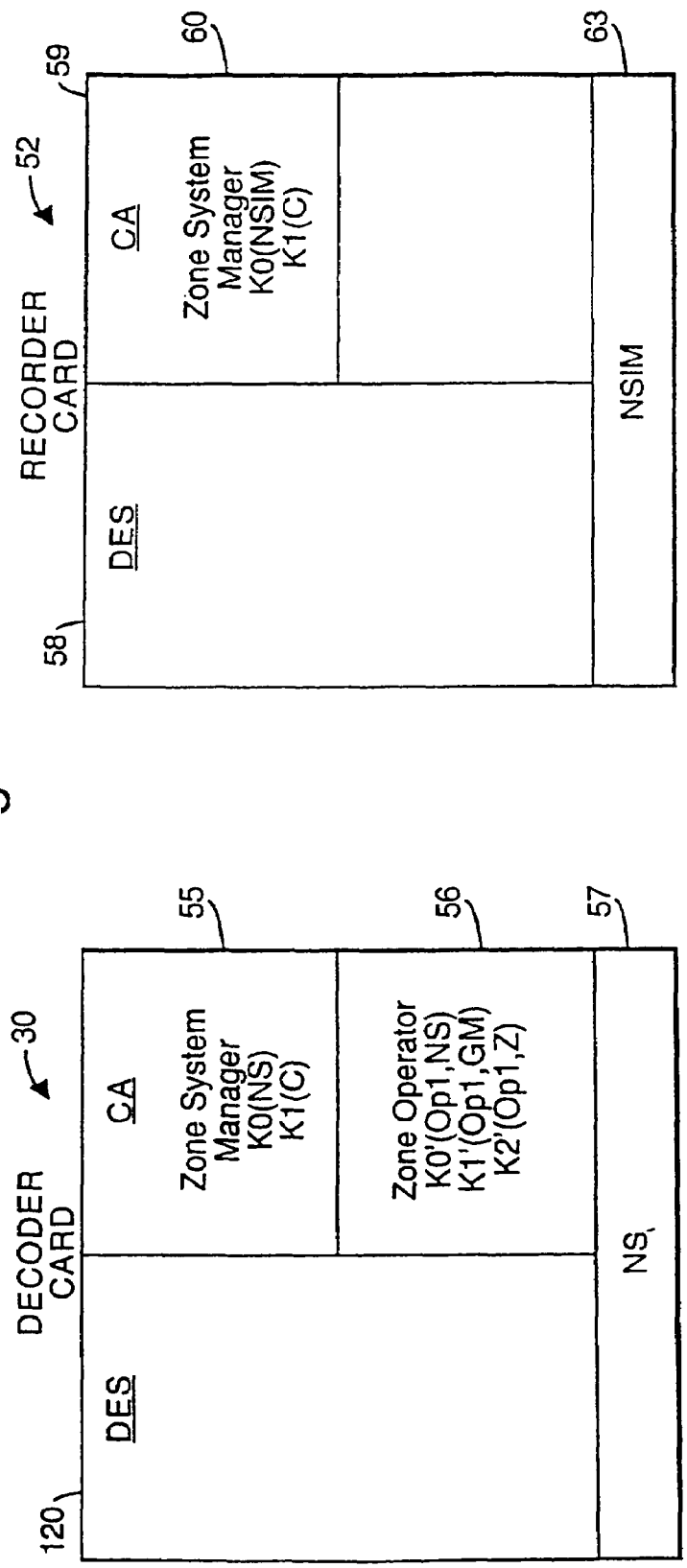
FIG. 12 shows in schematic form the organization of zones within the memory cards of the decoder and recording device according to a second embodiment of the invention.

Referring to FIG. 12, the structure of the conditional access zones in the decoder smart card 30 and recorder SIM card 52 in such a system are shown. As before, both cards include zones reserved for operations using the CA algorithm and storage of key data, in particular system manager zones 55,60 and operator zones 56,61.

In the present embodiment, the system manager zone 55 of the decoder card 30 includes, in addition to the key KO(NS), an audience key K1(C) common to all cards personalized and managed by the system manager and formed by the diversification of a CA key by a constant value C. This key K1(C) is also present in the system management zone 60 of the recorder card 52.

The other significant change in comparison with the zone structure of the previous embodiment is that the smart card 30 is additionally provided with the DES algorithm and includes a DES operating zone 120.

Figure 13:
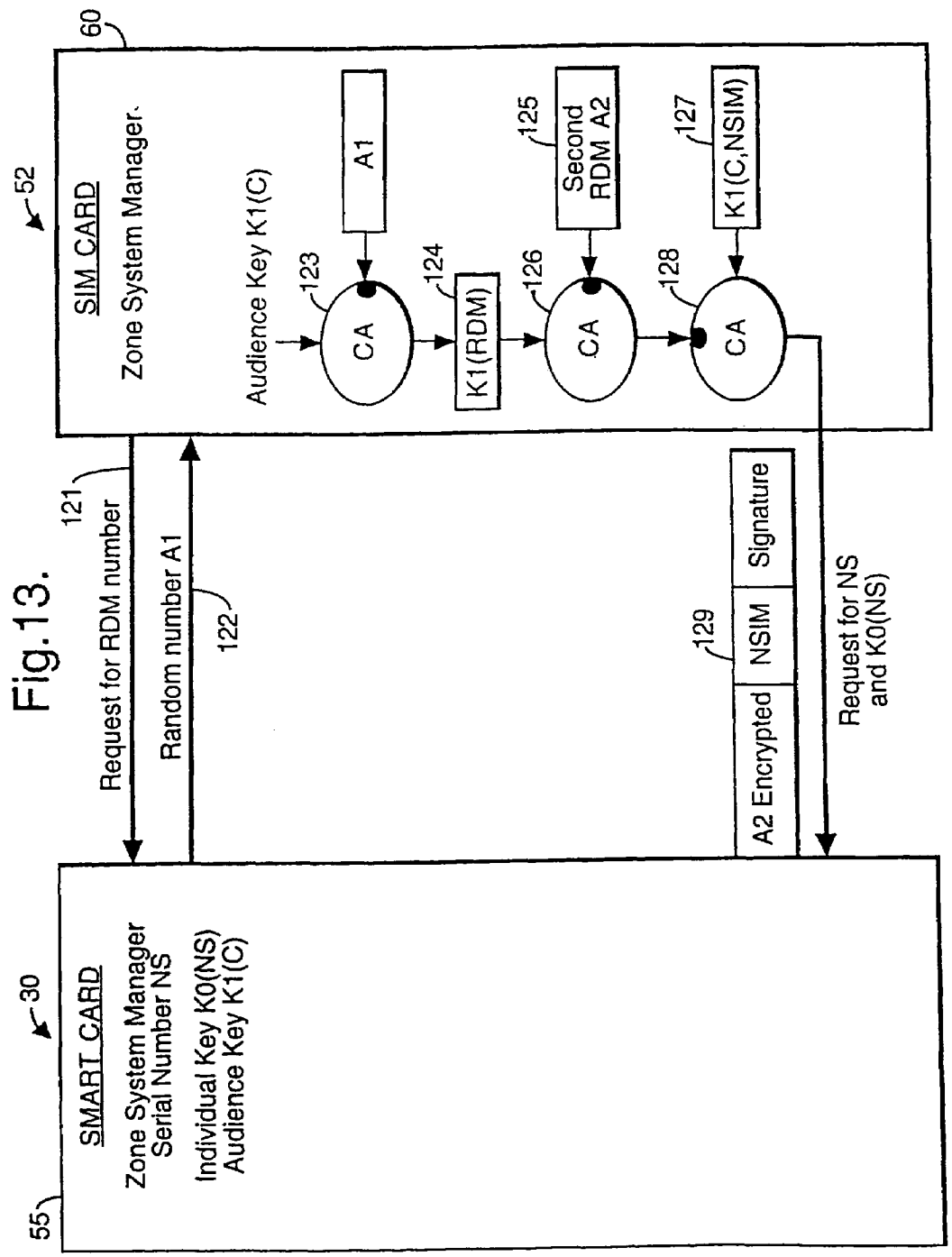
FIGS. 13 and 14 show the initial mutual authorization steps and transfer of data between the decoder memory card and the recorder memory card according to this second embodiment.

In order to enable the decoder smart card and recorder SIM card to work together and, in particular, to enable the eventual generation of a recording transport key TR, it is necessary for a mutual authentication of both cards to be carried out. As shown in FIG. 13, as a first step 121 the recorder SIM card 52 requests a random number from the decoder smart card 30 which returns the number A1 at 122. This number is then used to diversify the audience key KI(C) at step 123 to generate the key K1 (C, A1) shown at step 124. The SIM card then generates a second random number A2 shown at 125, which is in turn encrypted by the key K1(C, A1) at 126. Before communication to the smart card, this message is again encrypted and signed at 128 by a second key K1(C, NSIM) shown at 127 and formed by diversifying the audience key K1(C) by the value NSIM. The message 129 thus formed is sent as a request for serial number NS 57 and associated individual key KO(NS) to the decoder smart card 30.

Figure 14:
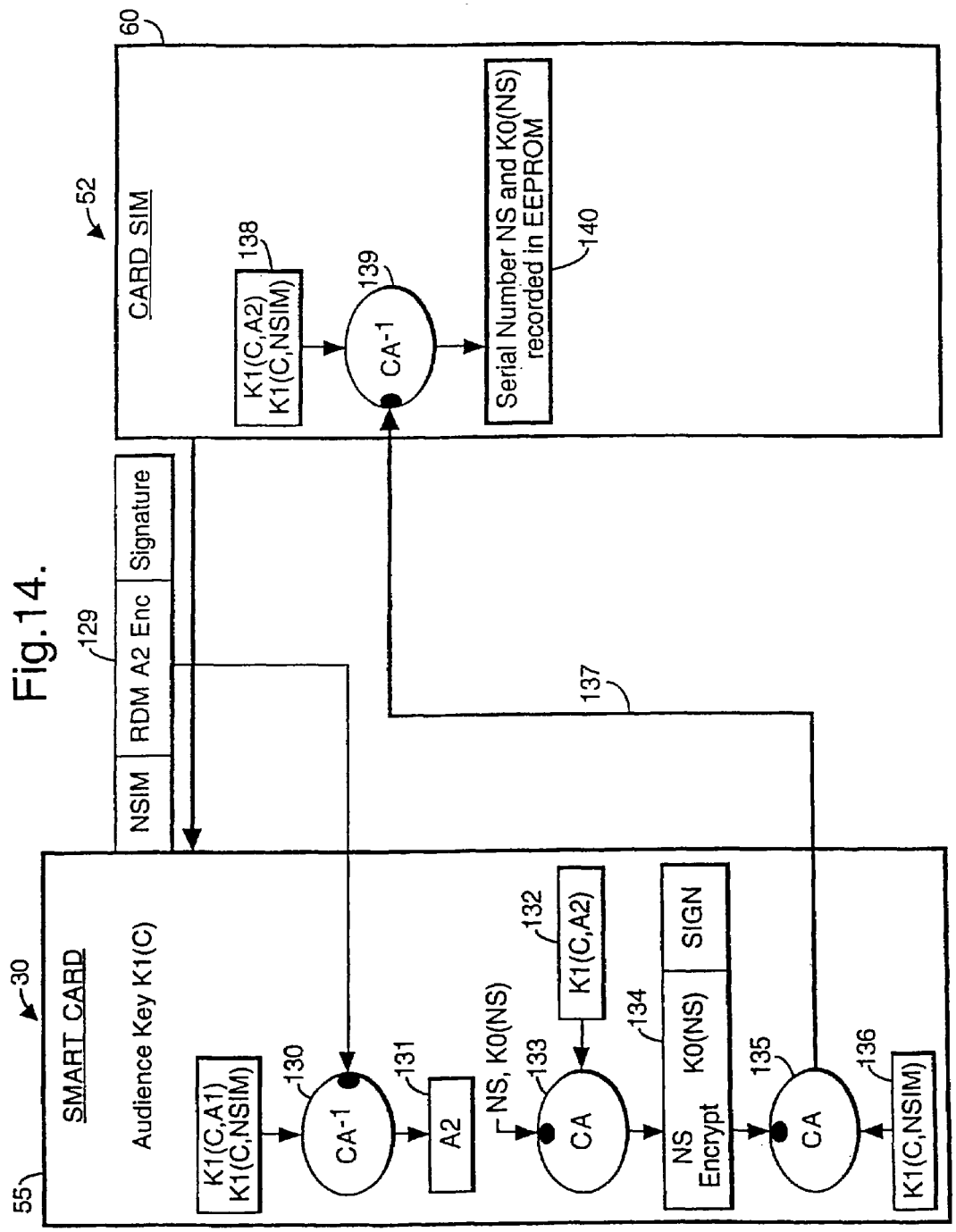

Referring to FIG. 14, on arrival at the decoder smart card 30, the communicated value NSIM is used by the smart card to generate the key K1(C, NSIM). The value of A2 is then decrypted at 130 using this key and the key K1 (C, A1) obtained by the smart card using the random number A1 that it had previously generated and stored in its memory.

This random number value A2 obtained at 131 is then used to diversify the audience key K1(C) to obtain the key K1 (C, A2) shown at 132. The key K1(C, A2) then encrypts the smart card unique serial number NS and system key KO (NS) at 133 to create the message 134.

As before, this message is then re-encrypted at 135 using the key [K1] (C, NSIM) shown at 136 and the message returned to the recorder SIM card 52 as shown at 137.

The recorder SIM card generates the keys K1 (C, A2) and K1 (C, NSIM) shown at 138 by diversifying the key K1(C) by the NSIM serial number 63 and the previously generated and memorized random number A2. These keys are used to decrypt at 139 the messages so as to obtain the unique serial number NS and unique system manager key KO (NS) of the smart card, this information thereafter being recorded in the memory of the recorder SIM card at 140. Unlike the previous embodiment, in which doubles of all system manager and operator keys were taken to ensure independent operation of the recorder SIM card, the double key KO(NS) and the smart card serial number NS are used to set up a session key for recording and to enable secure communication between the cards during a recording session, notably to enable secure communication of a recording transport key.

In this embodiment, the initial decryption of the CW is handled by the smart card using the operator keys and monthly exploitation keys that it possesses. Whilst it is conceivable that the control word CW could be passed directly to the SIM card during the creation of a recording it is desirable for security reasons to use a session key to transport the control word CW for this purpose.

Figure 15:
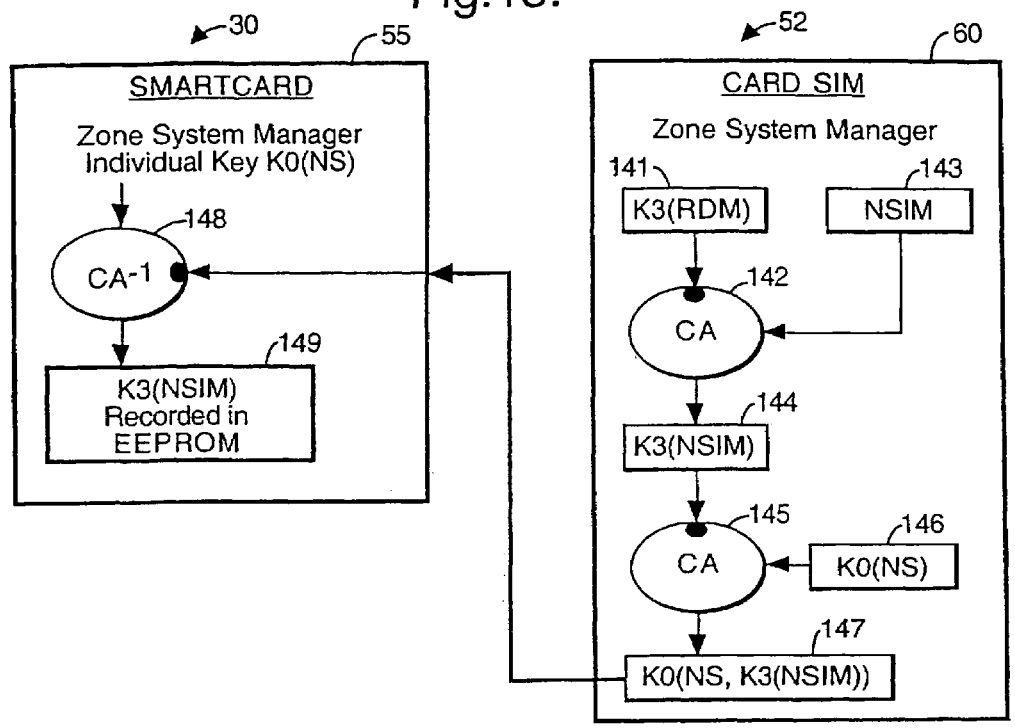
FIG. 15 shows the creation and communication of a session key to be used by both memory cards during recording of a program in this second embodiment.

FIG. 15 shows one way of creating such a key. As shown, the recorder SIM card 52 picks a random key K3 shown at 141 and diversifies this key at 142 with the SIM card serial number NSIM shown at 143. The key K3 may be taken from any one of a number of such keys stored for this purpose in the system manager zone. The CA session key K3 (NSIM) thus created at 144 is then encrypted at 145 using the previously obtained smart card system manager key KO(NS) shown at 146. The message 147 thus generated is thereafter transmitted to the decoder smart card 55 which uses its key KO(NS) to decrypt the message at 148 and store the session key K3 (NSIM) in the memory of the card at step 149.

Figure 16:
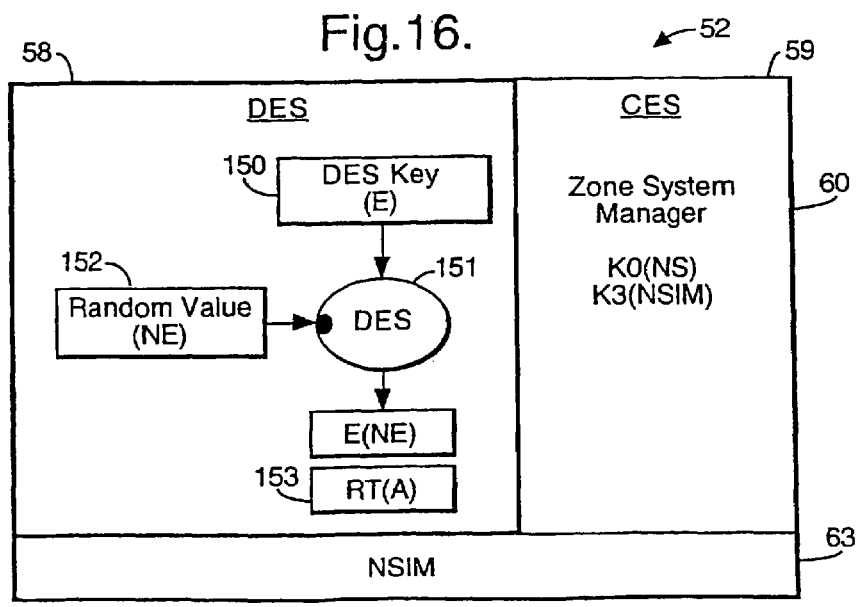
FIG. 16 shows the operation of the recorder card to generate a recording encryption key in this second embodiment.

Referring to FIG. 16, the state of the recorder SIM card prior to a recording operation will now be described. The system manager zone 60 includes the smart card key KO(NS) and the session key K3 (NSIM) as well as the normally present system keys KO(NSIM) etc. (not shown). In addition, the card creates a DES recording encryption key from a DES key E shown at 150 by diversifying this key at 151 by a random value NE shown at 152. As before, the resulting recording encryption key E (NE) will be used in the re-encryption of the control words associated with a program. Similarly, a recording transport key RT (A) shown at 153 is generated to be used to encrypt the recording encryption key E (NE) also recorded on the digital support medium.

Unlike the previous embodiment, in which the recording transport key was generated at the access control server, the key RT (A) is generated by the recorder SIM card itself using a DES key diversified by a random number A. In order to safeguard a copy of this key a copy is communicated to the decoder smart card. For obvious security reasons, this copy is communicated in encrypted form, for example, as encrypted by the smart card key KO(NS) currently store in the SIM card memory.

Referring to FIG. 20, upon first insertion in the decoder the recorder SIM card 52 first sends a request 190 to the smart card to see if a value of RT (A) has already been generated. An evaluation is carried out by the decoder smart card 30 at 191.

If the answer is negative, the recorder SIM card 52 generates a random DES key RT at 192, which value is diversified at 193 by a random value A shown at 194 to generate the key RT (A) shown at 195. This key value RT (A) is then encrypted at 196 using the custom algorithm and the key KO(NS) shown at 197 and the resulting message 198 then sent to the decoder smart card 30 for decryption and safeguard of the key RT (A).

If the determination at 191 is positive, then the previously stored value of RT (A) is sent back at 199 to the recorder SIM card 52.

Figure 17:
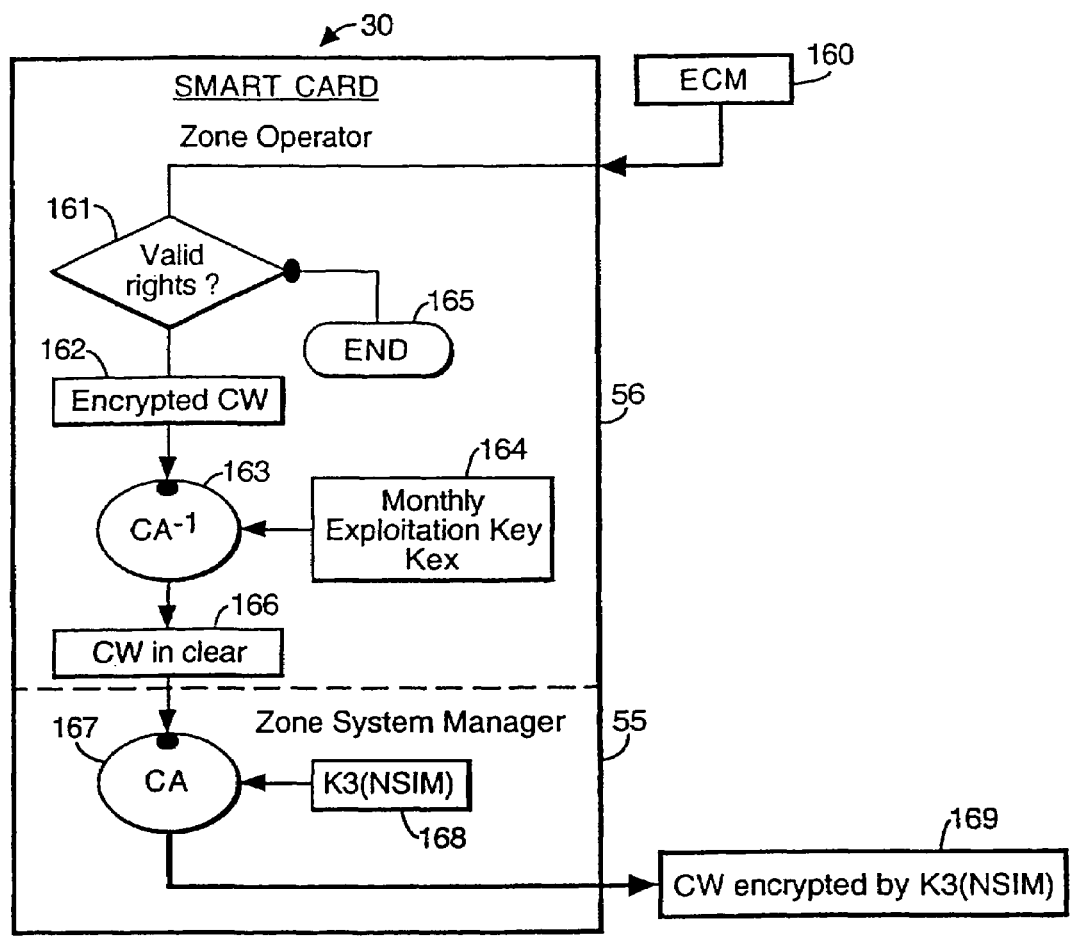
FIG. 17 shows the treatment of transmission ECMs by the decoder card in order to communicate the control word CW in encrypted form to the recorder card in this second embodiment.

Referring to FIG. 17, the operations of the decoder smart card 30 during recording of a scrambled transmission will now be described. As mentioned above, in this embodiment, the decoder smart card handles the initial decryption steps using the operator keys before communicating the value of the control word CW to the recorder SIM card 52.

As shown, the decoder smart card 30 receives an ECM 160 for processing in the operator zone 56. Firstly, the smart card 30 checks that it has the rights to access this program (S161). Assuming that this is the case, the encrypted code word CW is extracted from the ECM at 162 and decrypted at 163 using the appropriate exploitation key Kex shown at 164. Otherwise, the process ends as shown at 165.

As mentioned above, the clear value of the control word CW shown at 166 cannot be directly communicated to the recorder SIM card. Accordingly, the control word CW is encrypted at 167 using the session key K3 (NSIM) shown at 168 and the resulting value 169 communicated to the recorder card SIM for the next steps in the process.

Figure 18:
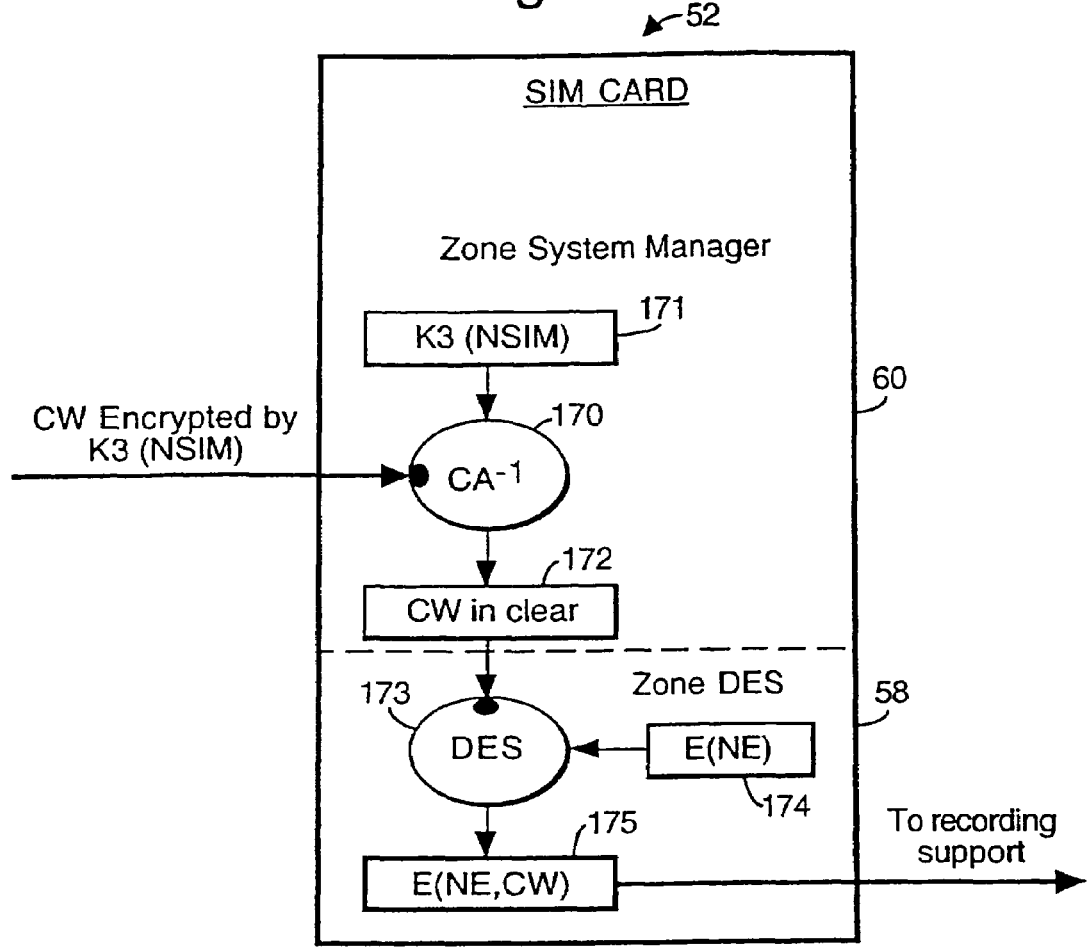
FIGS. 18 and 19 show the preparation of ECM and EMM messages for recording on the digital recording support according to this second embodiment.

Referring to FIG. 18, the control word encrypted by the session key is received by the recorder SIM card 52 which carries out a decryption process at 170 using the equivalent of the session key K3 (NSIM) previously stored in memory shown at 171. The clear value of the control word CW at 172 is then passed to the DES zone 58 of the card for encryption at 173 using the recording encryption key E [(NE)] shown at 174. The resulting encrypted value 175 is then encapsulated in an ECM and inserted in the data stream for recording with the still scrambled data on the recording support.

Figure 19:
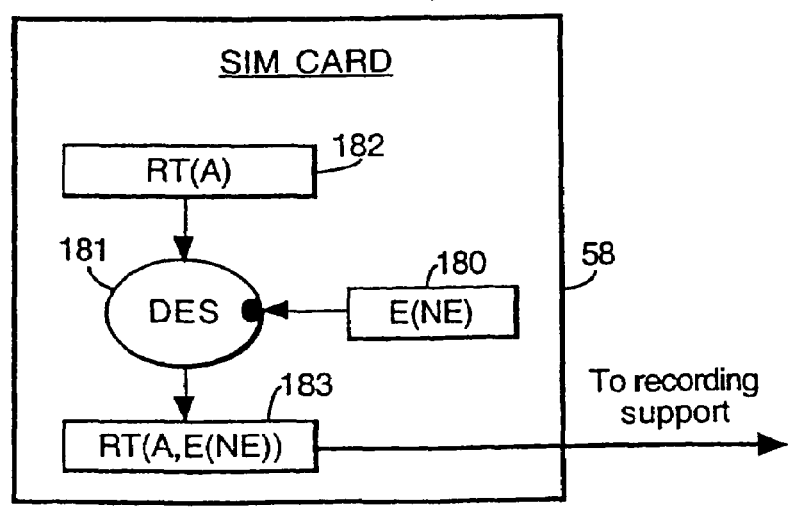

At the same time and in a similar manner to the first embodiment, the recording encryption key value shown at 180 in FIG. 19 is encrypted at 181 using the recording transport key RT (A) shown at 182. The resulting encrypted value 183 is encapsulated in an EMM for recording in the header of the digital recording.

During replay of the recording, and as described before in relation to FIG. 11, the EMM at the start of a recording containing the recording encryption key E(NE) is decrypted by the recorder SIM card using the recording transport key RT (A). The recording encryption key E (NE) is then used to decrypt each ECM so as to obtain the control word CW associated with that particular section of the scrambled recording. The recording is then descrambled and played.

As will be understood, the presence of a safeguard copy of the recording transport key RT (A) stored in the decoder smart card means that, in the event of loss or breakdown of the recorder SIM card, a replacement recorder card may be generated. Unlike the previous embodiment, however, it is not necessary to use a centralized server to maintain this duplicate copy.

As will be understood, alternative embodiments may be envisage. For example, in the above embodiments the encryption recording key E [(NE)] is generated using a key and a random number. However, in alternative embodiments the key E [(NE)] may be generated from a key diversified by the serial number of the recording device itself (i.e. not the recorder SIM card) to link a given recording to both the recorder SIM card and the recording device.

Similarly, certain elements of the first embodiment such as a centralized transport key store and an autonomously operating recorder are independent from each other and may be used in the second embodiment, and vice versa.

The invention claimed is:

1. A method of recording transmitted digital data, comprising:
   receiving the transmitted digital data comprising scrambled data and encrypted transmitted digital information;
   decrypting the encrypted transmitted digital information to obtain transmitted digital information, wherein the transmitted digital information comprises a control word, and wherein the control word is used to descramble the scrambled data;
   re-encrypting the transmitted digital information using a recording encryption key;
   storing the re-encrypted transmitted digital information and the scrambled data by a recording means on a recording support medium;
   encrypting the recording encryption key by a recording transport key; and
   storing the encrypted recording encryption key to the recording support medium,
   wherein at least one of the recording encryption key and the recording transport key is stored on a portable security module associated with the recording means.

2. The method as claimed in claim 1, in which the transmitted information is encrypted prior to transmission and received by a decoder means before being communicated to the recording means.

3. The method as claimed in claim 2, in which the decoder is associated with a portable security module used to store transmission access control keys (KO(NS), KO'(Op1, NS) etc.) used to decrypt the transmitted encrypted information.

4. The method as claimed in claim 3, in which at least one of the recording encryption key (E (NE)) and the recording transport key (RT (A)) function in accordance with a first encryption algorithm (DES) and the transmission access control keys (KO(NS), KO' (Op1, NS) etc.) function in accordance with a second encryption algorithm (CA).

5. The method as claimed in claim 1, which the recording transport key (RT (A)) is generated at a central recording authorization unit and a copy of this key communicated to the recording means.

6. The method as claimed in claim 5, in which the recording transport key (RT (A)) is encrypted by a further encryption key (KO(NSIM)) prior to being communicated to the recording means.

7. The method as claimed in claim 1, in which a central access control system communicates transmission access control keys (KO (NS), KO'(Op1, NS) etc.) to the recording means.

8. The method as claimed in claim 7, in which the transmission access control keys (KO(NS), KO' (Op1, NS) etc.) are communicated to a portable security module associated with the recording means.

9. The method as claimed in claim 7, in which the recording means directly descrambles transmitted information using the transmission access keys (KO (NS), KO'(Op1, NS) etc.) prior to re-encryption of the information by the recording encryption key (E (NE)) and storage on the support medium.

10. The method as claimed in claim 7, in which the central access control system encrypts the broadcast access control keys (KO(NS), KO' (Op1, NS) etc.) by a further encryption key (KO (NSIM)) prior to their communication to the recording means.

11. The method as claimed in claim 7, in which the recording means sends a request to the central access control system including information identifying the broadcast access keys needed (KO(NS), KO'(Op1, NS) etc.), the request of authentication by the recording means using a key (KO(NSIM)) unique to that recording means.

12. The method as claimed in claim 1, using a decoder means and associated security module and a recording means and associated security module and in which a copy of the recording transport key (RT (A)) is stored in at least one of the security module associated with the decoder means and the security module associated with the recording means.

13. The method as claimed in claim 12, in which the recording transport key (RT (A)) is generated by either the recording security module or decoder security module and communicated to the other security module.

14. The method as claimed in claim 13, in which the recording transport key (RT (A)) is encrypted before communication to the other security module and decrypted by a key unique (KO(NS)) to that other security module.

15. The method as claimed in claim 14, in which the decoder security module and recording security module carry out a mutual authorization process, the unique decryption key (KO (NS)) being passed to the other security module from the encrypting security module depending on the results of the mutual authorization.

16. The method as claimed in claim 15, in which the mutual authorization step is carried out using, inter alia, an audience key K1 (C) known to both security modules.

17. The method as claimed in claim 12, in which the decoder security module possesses transmission access control keys (KO(NS), KO' (Op1, NS) etc.) to decrypt the transmitted information in an encrypted form and a session key (K3 (NSIM)) re-encrypt the information prior to communication to the recording security module, the recording security module possessing an equivalent of the session key (K3 (NSIM)) to decrypt the information prior to encryption by the recording transport key (RT (A)).

18. The method as claimed in claim 17, in which the session key (K3 (NSIM)) is generated by one of the decoder security module and recording means security module and communicated to the other module in encrypted form using an encryption key (KO (NS)) uniquely decryptable by other security module.

19. A system for recording transmitted digital data, comprising:
   a receiver/decoder for at least:
      receiving the transmitted digital data, wherein the transmitted digital data comprises scrambled data and encrypted transmitted digital information, wherein the encrypted transmitted digital information comprises a control word used to descramble the scrambled data;
      decrypting the encrypted transmitted digital information to obtain the control word,
      wherein the transmitted digital data is re-encrypted using a recording encryption key; and
   a recording means for recording the re-encrypted transmitted digital information to a recording support medium, along with an encrypted recording encryption key, wherein the recording encryption key is encrypted via a recording transport key to obtain the encrypted recorded encryption key.

20. The system as claimed in claim 19, further comprising:
   a decoder means and associated security module adapted to store a copy of the recording transport key (RT(A)).

21. The system as claimed in claim 20, in which the security module associated with the decoder means is adapted to descramble transmitted information using one or more transmission access keys prior to re-encryption by a session key for subsequent communication to the recording means.

22. A system for recording transmitted digital data comprising scrambled data and encrypted transmitted digital information, comprising:
   a recording support medium configured to store the encrypted transmitted digital information, and an encrypted recording encryption key, wherein the encrypted transmitted digital information comprises a control word used to descramble the scrambled data, wherein the transmitted digital information is re-encrypted using a recording encryption key, and wherein the encrypted recording encryption key is encrypted using a recording transport key; and
   a portable security module configured to store at least one of the recording encryption key and the recording transport key.

23. A recording support medium, comprising:
   transmitted digital data, wherein the transmitted digital data comprises scrambled data and encrypted transmitted digital information, wherein the encrypted transmitted digital information comprises a control word used to descramble the scrambled data, and wherein the encrypted transmitted digital information is decrypted to obtain the control word,
   wherein the decrypted transmitted digital information is re-encrypted using a recording encryption key; and
   an encrypted recording encryption key, wherein the encrypted recording encryption key is encrypted using a recording transport key.

24. A receiver/decoder used in a conditional access digital television system, comprising:
   means for receiving transmitted digital data comprising scrambled data and encrypted transmitted digital information, wherein the encrypted transmitted digital information comprises a control word used to descramble the scrambled data; and
   means for decrypting the encrypted transmitted digital information to obtain the control word;
   wherein the transmitted digital data is re-encrypted using a recording encryption key,
   wherein the recording encryption key is encrypted via a recording transport key to obtain an encrypted recorded encryption key, and
   wherein the receiver/decoder is operatively connected to a recording means for recording the re-encrypted transmitted digital information and the encrypted recording encryption key to a recording support medium.

* * * * *

UNITED STATES PATENT AND TRADEMARK OFFICE
CERTIFICATE OF CORRECTION

| | | |
|---|---|---|
| PATENT NO. | : 7,239,704 B1 | Page 1 of 1 |
| APPLICATION NO. | : 09/622137 | |
| DATED | : July 3, 2007 | |
| INVENTOR(S) | : Michel A. Maillard et al. | |

It is certified that error appears in the above-identified patent and that said Letters Patent is hereby corrected as shown below:

On the Title page, section (56) References Cited, Foreign Patent Documents, line 3, "EP 0 769 936 A2 3/1997" should be --EP 0 76_3_ 936 A2 3/1997--.

In the Claims:

In Claim 11, column 19, line 8, the word "authentication" should be --authenti_f_ication--.

Signed and Sealed this

Twentieth Day of November, 2007

JON W. DUDAS
*Director of the United States Patent and Trademark Office*